US012719755B2

(12) United States Patent
Olshansky

(10) Patent No.: US 12,719,755 B2
(45) **Date of Patent: *Aug. 25, 2026**

(54) SYSTEMS AND METHODS FOR GROUP BANDWIDTH MANAGEMENT IN A COMMUNICATION SYSTEMS NETWORK

(71) Applicant: Nomadix, Inc., Woodland Hills, CA (US)

(72) Inventor: Vadim Olshansky, Tarzana, CA (US)

(73) Assignee: Nomadix, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,018

(22) Filed: Mar. 1, 2024

(65) Prior Publication Data

US 2024/0406071 A1 Dec. 5, 2024

Related U.S. Application Data

(63) Continuation of application No. 16/399,855, filed on Apr. 30, 2019, now Pat. No. 11,949,562, which is a (Continued)

(51) Int. Cl.
*H04L 41/0896* (2022.01)
*G06F 3/04847* (2022.01)
(Continued)

(52) U.S. Cl.
CPC ...... *H04L 41/0896* (2013.01); *G06F 3/04847* (2013.01); *H04L 47/20* (2013.01); *H04L 47/828* (2013.01); *H04W 8/04* (2013.01)

(58) Field of Classification Search
None
See application file for complete search history.

(56) References Cited

U.S. PATENT DOCUMENTS 5,113,499 A 5/1992 Ankney
5,185,860 A 2/1993 Wu
(Continued)

FOREIGN PATENT DOCUMENTS

EP 0573739 A2 12/1993
EP 0742657 A2 11/1996
(Continued)

OTHER PUBLICATIONS

Anderson et al., "The Magicrouter, an Application of Fast Packet Interposing," May 17, 1996, pp. 1-12.
(Continued)

*Primary Examiner* — Adnan Baig
(74) *Attorney, Agent, or Firm* — Morrison & Foerster LLP

(57) ABSTRACT

An embodiment is a method of managing bandwidth, performed by a computing system. The system receives user-selected connection parameters associated with a subscriber device. The system associates a network identifier of the subscriber device with a group bandwidth policy, based on the user-selected connection parameters. The system stores, in computer-readable storage media, parameters associated with the group bandwidth policy, in association with the network identifier of the subscriber device. The system receives, at a gateway device, network communication data from the subscriber device. The system limits, at the gateway device, bandwidth available to the network communication data, based on the stored parameters associated with the group bandwidth policy.

17 Claims, 12 Drawing Sheets

Related U.S. Application Data continuation of application No. 14/832,945, filed on Aug. 21, 2015, now abandoned, which is a continuation of application No. 13/352,255, filed on Jan. 17, 2012, now Pat. No. 9,118,578.

(60) Provisional application No. 61/433,908, filed on Jan. 18, 2011.

(51) Int. Cl.
*H04L 47/20* (2022.01)
*H04L 47/70* (2022.01)
*H04W 8/04* (2009.01)

(56) References Cited

U.S. PATENT DOCUMENTS 5,293,488 A 3/1994 Riley
5,446,735 A 8/1995 Tobagi
5,678,041 A 10/1997 Baker
5,699,520 A 12/1997 Hodgson
5,708,654 A 1/1998 Arndt
5,708,780 A 1/1998 Levergood
5,745,481 A 4/1998 Phillips
5,745,884 A 4/1998 Carnegie
5,757,784 A 5/1998 Liebowitz
5,787,483 A 7/1998 Jam
5,793,978 A 8/1998 Fowler
5,802,310 A 9/1998 Rajaraman
5,835,061 A 11/1998 Stewart
5,845,692 A 12/1998 Kellem
5,940,394 A 8/1999 Killian
5,969,678 A 10/1999 Stewart
5,978,387 A 11/1999 Sherman
5,987,430 A 11/1999 Van
6,035,405 A 3/2000 Gage
6,064,674 A 5/2000 Doidge
6,078,953 A 6/2000 Vaid
6,115,545 A 9/2000 Mellquist
6,130,892 A 10/2000 Short
6,141,690 A 10/2000 Weiman
6,173,322 B1 1/2001 Hu
6,194,992 B1 2/2001 Short
6,226,677 B1 5/2001 Slemmer
6,232,764 B1 5/2001 Rettig
6,240,533 B1 5/2001 Slemmer
6,256,307 B1 7/2001 Salmonson
6,256,674 B1 7/2001 Manning
6,259,405 B1 7/2001 Stewart
6,307,836 B1 10/2001 Jones
6,310,886 B1 10/2001 Barton
6,317,790 B1 11/2001 Bowker
6,326,918 B1 12/2001 Stewart
6,341,309 B1 1/2002 Vaid
6,377,990 B1 4/2002 Slemmer
6,414,635 B1 7/2002 Stewart
6,427,170 B1 7/2002 Sitaraman
6,438,125 B1 8/2002 Brothers
6,452,498 B2 9/2002 Stewart
6,453,353 B1 9/2002 Win
6,470,027 B1 10/2002 Birrell, Jr.
6,470,386 B1 10/2002 Combar
6,571,221 B1 5/2003 Stewart
6,574,664 B1 6/2003 Liu
6,584,505 B1 6/2003 Howard
6,609,153 B1 8/2003 Salkewicz
6,618,355 B1 9/2003 Gulliford
6,636,894 B1 10/2003 Short
6,654,808 B1 11/2003 Chuah
6,697,018 B2 2/2004 Stewart
6,732,176 B1 5/2004 Stewart
6,735,633 B1 5/2004 Welch
6,738,371 B1 5/2004 Ayres
6,738,382 B1 5/2004 West
6,751,677 B1 6/2004 Ilnicki
6,759,960 B2 7/2004 Stewart
6,760,416 B1 7/2004 Banks
6,779,118 B1 8/2004 Ikudome
6,789,110 B1 9/2004 Short
6,795,852 B1 9/2004 Kleinrock
6,810,426 B2 10/2004 Mysore
6,823,059 B2 11/2004 Kalmanek, Jr.
6,826,694 B1 11/2004 Dutta
6,834,341 B1 12/2004 Bahl
6,856,800 B1 2/2005 Henry
6,857,009 B1 2/2005 Ferreria
6,868,399 B1 3/2005 Short
6,934,754 B2 8/2005 West
6,950,628 B1 9/2005 Meier
6,970,927 B1 11/2005 Stewart
6,996,073 B2 2/2006 West
7,003,578 B2 2/2006 Kanada
7,007,080 B2 2/2006 Wilson
7,009,556 B2 3/2006 Stewart
7,016,960 B2 3/2006 Howard
7,020,082 B2 3/2006 Bhagavath
7,032,243 B2 4/2006 Leerssen
7,058,594 B2 6/2006 Stewart
7,072,056 B1 7/2006 Greaves
7,080,077 B2 7/2006 Ramamurthy
7,088,727 B1 8/2006 Short
7,117,526 B1 10/2006 Short
7,120,678 B2 10/2006 Greuel
7,126,915 B1 10/2006 Lu
7,194,554 B1 3/2007 Short
7,197,556 B1 3/2007 Short
7,216,152 B2 5/2007 Short
7,240,106 B2 7/2007 Cochran
7,269,653 B2 9/2007 Mentze
7,269,727 B1 9/2007 Mukherjee
7,336,960 B2 2/2008 Zavalkovsky
7,349,982 B2 3/2008 Hannum
7,356,841 B2 4/2008 Wilson
7,376,113 B2 5/2008 Taylor
7,428,413 B2 9/2008 Fink
7,472,191 B2 12/2008 Stewart
7,474,617 B2 1/2009 Molen
7,493,084 B2 2/2009 Meier
7,526,538 B2 4/2009 Wilson
7,536,714 B2 5/2009 Yuan
7,554,995 B2 6/2009 Short
7,562,393 B2 7/2009 Buddhikot
7,580,376 B2 8/2009 West
7,606,146 B1 10/2009 Pan
7,689,716 B2 3/2010 Short
7,698,432 B2 4/2010 Short
7,739,383 B1 6/2010 Short
7,752,334 B2 7/2010 Paunikar
7,822,873 B1 10/2010 Paunikar
7,953,857 B2 5/2011 Short
7,958,256 B2 6/2011 Keeler
8,027,339 B2 9/2011 Short
8,051,206 B2 11/2011 Paunikar
8,185,127 B1 * 5/2012 Cai ...................... H04W 28/18
455/452.2
8,244,886 B2 8/2012 Short
8,266,266 B2 9/2012 Short
8,566,912 B2 10/2013 Olshansky
8,594,107 B2 11/2013 Short
8,626,922 B2 1/2014 Short
8,868,740 B2 10/2014 Pitchaikani
9,118,578 B2 8/2015 Olshansky
9,160,674 B2 10/2015 Short
11,949,562 B2 4/2024 Olshansky
2002/0006788 A1 1/2002 Knutsson
2003/0087629 A1 5/2003 Juitt
2003/0152067 A1 8/2003 Richmond
2003/0235209 A1 12/2003 Garg
2004/0015572 A1 1/2004 Kang
2004/0203752 A1 10/2004 Wojaczynski
2005/0025158 A1 2/2005 Ishikawa
2005/0055220 A1 3/2005 Lee
2005/0091539 A1 4/2005 Wang
2005/0143065 A1 6/2005 Pathan

(56) References Cited

U.S. PATENT DOCUMENTS

| | | | | |
|---|---|---|---|---|
| 2005/0148342 | A1 | 7/2005 | Sylvain | |
| 2005/0260973 | A1 | 11/2005 | Van | |
| 2006/0089122 | A1 | 4/2006 | Zavalkovsky | |
| 2006/0120282 | A1 | 6/2006 | Carlson | |
| 2006/0135155 | A1 | 6/2006 | Chung | |
| 2006/0239254 | A1* | 10/2006 | Short | H04L 63/0892 370/352 |
| 2007/0162598 | A1 | 7/2007 | Gorodyansky | |
| 2007/0271598 | A1 | 11/2007 | Chen | |
| 2008/0014884 | A1 | 1/2008 | Oyman | |
| 2008/0162635 | A1* | 7/2008 | Keren | H04M 3/567 709/204 |
| 2008/0271109 | A1 | 10/2008 | Singh | |
| 2009/0016279 | A1 | 1/2009 | Beser | |
| 2009/0225762 | A1* | 9/2009 | Davidson | H04L 47/825 370/401 |
| 2009/0282127 | A1 | 11/2009 | Leblanc | |
| 2010/0005499 | A1 | 1/2010 | Covey | |
| 2010/0020685 | A1 | 1/2010 | Short | |
| 2010/0161722 | A1* | 6/2010 | Jeon | G06Q 10/107 709/203 |
| 2010/0189129 | A1 | 7/2010 | Hinosugi | |
| 2010/0192213 | A1* | 7/2010 | Ta | H04L 47/32 709/225 |
| 2010/0312892 | A1 | 12/2010 | Woundy | |
| 2011/0030037 | A1 | 2/2011 | Olshansky | |
| 2011/0113455 | A1 | 5/2011 | Wu | |
| 2012/0195209 | A1 | 8/2012 | Jain | |
| 2012/0213185 | A1* | 8/2012 | Frid | H04L 67/12 370/329 |
| 2016/0057017 | A1 | 2/2016 | Olshansky | |
| 2016/0205031 | A1 | 7/2016 | Short | |

FOREIGN PATENT DOCUMENTS

| | | | |
|---|---|---|---|
| EP | 0767595 | A1 | 4/1997 |
| EP | 0873037 | A1 | 10/1998 |
| EP | 0901301 | A2 | 3/1999 |
| GB | 2283645 | A | 5/1995 |
| GB | 2311439 | A | 9/1997 |
| JP | 10105516 | | 4/1998 |
| JP | 11282804 | | 10/1999 |
| JP | 2004207820 | A | 7/2004 |
| JP | 2004213632 | A | 7/2004 |
| JP | 2005064922 | A | 3/2005 |
| JP | 2005072679 | A | 3/2005 |
| JP | 2005506804 | A | 3/2005 |
| JP | 3880856 | B2 | 11/2006 |
| JP | 2010050550 | A | 3/2010 |
| JP | 5084086 | B2 | 9/2012 |
| JP | 2012533920 | A | 12/2012 |
| WO | 97002687 | | 1/1997 |
| WO | 97022936 | | 6/1997 |
| WO | 98016036 | | 4/1998 |
| WO | 98040990 | | 9/1998 |
| WO | 98054868 | | 12/1998 |
| WO | 01031861 | | 5/2001 |
| WO | 02005453 | | 1/2002 |
| WO | 2007090028 | A2 | 8/2007 |
| WO | 2011005710 | A2 | 1/2011 |
| WO | 2012099901 | A1 | 7/2012 |

OTHER PUBLICATIONS

Appenzeller, et al., "User-Friendly Access Control for Public Network Ports," Department of Computer Science, Stanford University, Aug. 31, 1998, pp. 8.

Barns Jr., "Defense Data Network Usage Accounting Enhancement Approaches," The MITRE Corporation, Apr. 1989, pp. 114.

Case No. Jul. 1946 DDP (VBKx) *Nomadix, Inc.* v. *Second Rule LLC*, Plaintiff Nomadix Inc.'s Proposed Claim Construction Statement, dated May 23, 2008 in 184 pages.

Case No. Jul. 1946 DDP (VBKx) *Nomadix, Inc.* v. *Second Rule LLC*, Proposed Joint Claim Construction Statement dated Jul. 2, 2008 in 31 pages.

Case No. Jul. 1946 GPS (VBK) *Nomadix, Inc.* v. *Second Rule LLC*, Complaint for Patent Infringement of U.S. Pat. Nos. 6,130,892; 7,088,727; 6,636,894; 6,857,009, and 6,868,399 dated Mar. 23, 2007 in 11 pages.

Case No. Jul. 1946 GPS (VBK) *Nomadix, Inc.* v. *Second Rule LLC*, Second Rule LLC's Response to Nomadix, Inc.'s Proposed Claim Construction Statement dated Jun. 6, 2008 in 74 pages.

Case No. CV 09-8441 (C.D. Cal. 2009), *Nomadix, Inc.* v. *Hewlett-Packard Co.*, Complaint for Patent Infringement of U.S. Pat. Nos. 6,130,892; 7,088,727; 7,554,995; 6,636,894; 7,195,554; 6,868,399 and 6,789,110 dated Nov. 17, 2009, in 189 pages.

Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10- CV-00381 DDP (VBKx), (Central District of California, Western Division), dated Jul. 22, 2011 in 24 pages.

Exhibit A, Asserted Claims, filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division), and dated Jul. 22, 2011, in 2 pages.

Exhibit B, Supplemental Prior Art List filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division), and dated Jul. 22, 2011, in 2 pages.

Exhibit C1, Claim Comparison for U.S. Pat. No. 6,130,892 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division), and dated Jul. 22, 2011, in 4 pages.

Exhibit C2, Claim Comparison for U.S. Pat. No. 7,088,727 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division), and dated Jul. 22, 2011, in 7 pages.

Exhibit C3, Claim Comparison for U.S. Pat. No. 7,554,995 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division), and dated Jul. 22, 2011, in 25 pages.

Exhibit C4, Claim Comparison for U.S. Pat. No. 6,636,894, filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division, and dated Jul. 22, 2011, in 18 pages.

Exhibit C5, Claim Comparison for U.S. Pat. No. 7,194,554 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division, and dated Jul. 22, 2011, in 18 pages.

Exhibit C6, Claim Comparison for U.S. Pat. No. 6,868,399 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division, and dated Jul. 22, 2011, in 22 pages.

Exhibit C7, U.S. Pat. No. 7,689,716 filed in Defendants' Supplemental Joint Invalidity Contentions, *NOMADIX, Inc.* v. *Hewlett-*

(56) References Cited

OTHER PUBLICATIONS

*Packard Company, et al.*, Case No. 09-CV-8441 DDP (VBKx) and *NOMADIX, Inc.* v. *Solutioninc Technologies Limited*, Case No. 2:10-CV-00381 DDP (VBKx), (Central District of California, Western Division, and dated Jul. 22, 2011, in 11 pages.
Final Office Action mailed Nov. 16, 2020, for U.S. Appl. No. 16/399,855, filed Apr. 30, 2019, 38 pages.
Final Office Action mailed Sep. 9, 2022, for U.S. Appl. No. 16/399,855, filed Apr. 30, 2019, 49 pages.
Giovanardi et al., "Transparent Mobile IP: an Approach and Implementation," Global Telecommunications Conference, Nov. 3-8, 1997, pp. 1861-1865.
Hluchyj et al., "Queueing Disciplines for Integrated Fast Packet Networks," SUPERCOMM/ICC '92, Discovering a New World of Communications, Jun. 14-18, 1992, pp. 0990-0996.
International Search Report and Written Opinion in PCT Application No. PCT/US2012/021596 (NOMDX.064WO), dated Jun. 1, 2012, in 17 pages.
Kalkbrenner et al., "Quality of Service (QoS) in Distributed Hypermedia-Systems," Jul. 1995, IEEE, v 10-8186-7180, pp. 529-534.
Kausar et al., "A Charging Model for Sessions on the Internet," European Conference on Multimedia Applications, Services and Techniques, Department of Computer Science, University College London, 1999, pp. 246-261.
Maebashi et al., "Development of Broadband Network Server for Visitors," NTT Docomo Technical Journal, Oct. 1, 2006, vol. 14, No. 3, pp. 77-79.
Maruyama et al., "A Secure LAN Sockets System for Everyone Which Need Not Modify Existing DHCP Clients", Study Report of Information Processing Society of Japan, Jul. 16, 1999, vol. 99, No. 56, pp. 131-136.
Nomadix, Inc.'s Amended Answer to iBahn General Holdings Corporation's Complaint and Counterclaims, *NOMDADIX, Inc.* v. *iBahn General Holdings Corporation*, (District of California, Case No. CV11-02604 DDP (VBKx), filed May 2, 2011 in 24 pages.
Non-Final Office Action mailed Dec. 29, 2021, for U.S. Appl. No. 16/399,855, filed Apr. 30, 2019, 36 pages.
Non-Final Office Action mailed Mar. 28, 2023, for U.S. Appl. No. 16/399,855, filed Apr. 30, 2019, 40 pages.
Non-Final Office Action mailed May 21, 2020, for U.S. Appl. No. 16/399,855, filed Apr. 30, 2019, 26 pages.
Notice of Allowance mailed Dec. 6, 2023, for U.S. Appl. No. 16/399,855, filed Apr. 30, 2019, 10 pages.
Oka et al., "A Study on per User Bandwidth Control Policy and Method for Providing Internet Connect Service", Technical Report of the Institute of Electronics, Information and Communication Engineers, Oct. 19, 2000, vol. 100, No. 393, p. 31-36.
Richards et al., "Mapping User Level QOS from a Single Parameter," 1998, pp. 1-15.
Rigney, C., "Radius Accounting," Network Working Group, RFC 2139, Apr. 1997, pp. 23.
Rupp et al., "Index: A Platform for Determining how People Value the Quality of their Internet Access," Proceedings of the Sixth IEEE/IFIP International Workshop on Quality of Service, May 1998, pp. 85-90.
Stevens, "TCP/IP Illustrated, vol. 1: The Protocols" Addison-Wesley Professional Computing Series, Jul. 2001, pp. 53-62 & 231-235.
Tanenbaum, Andrew S., "Computer Networks" Prentice Hall of India, 3rd Edition, May 2000, Chapter 5, Section 5, pp. 420-424.

* cited by examiner

RECEIVE DATA FROM SUBSCRIBER DEVICE
401
SUBSCRIBER DEVICE REQUIRES AUTHENTICATION ?
402
NO
YES
SEND REQUEST TO AAA SERVER
403
RECEIVE GROUP BANDWIDTH POLICY FROM AAA SERVER
404
GROUP BANDWIDTH POLICY INSTALLED ?
405
NO
INSTALL GROUP BANDWIDTH POLICY
407
YES
UPDATE GROUP BANDWIDTH POLICY IF NECESSARY
406
TRANSMIT DATA ACCORDING TO POLICY
408 http://www.example.com/

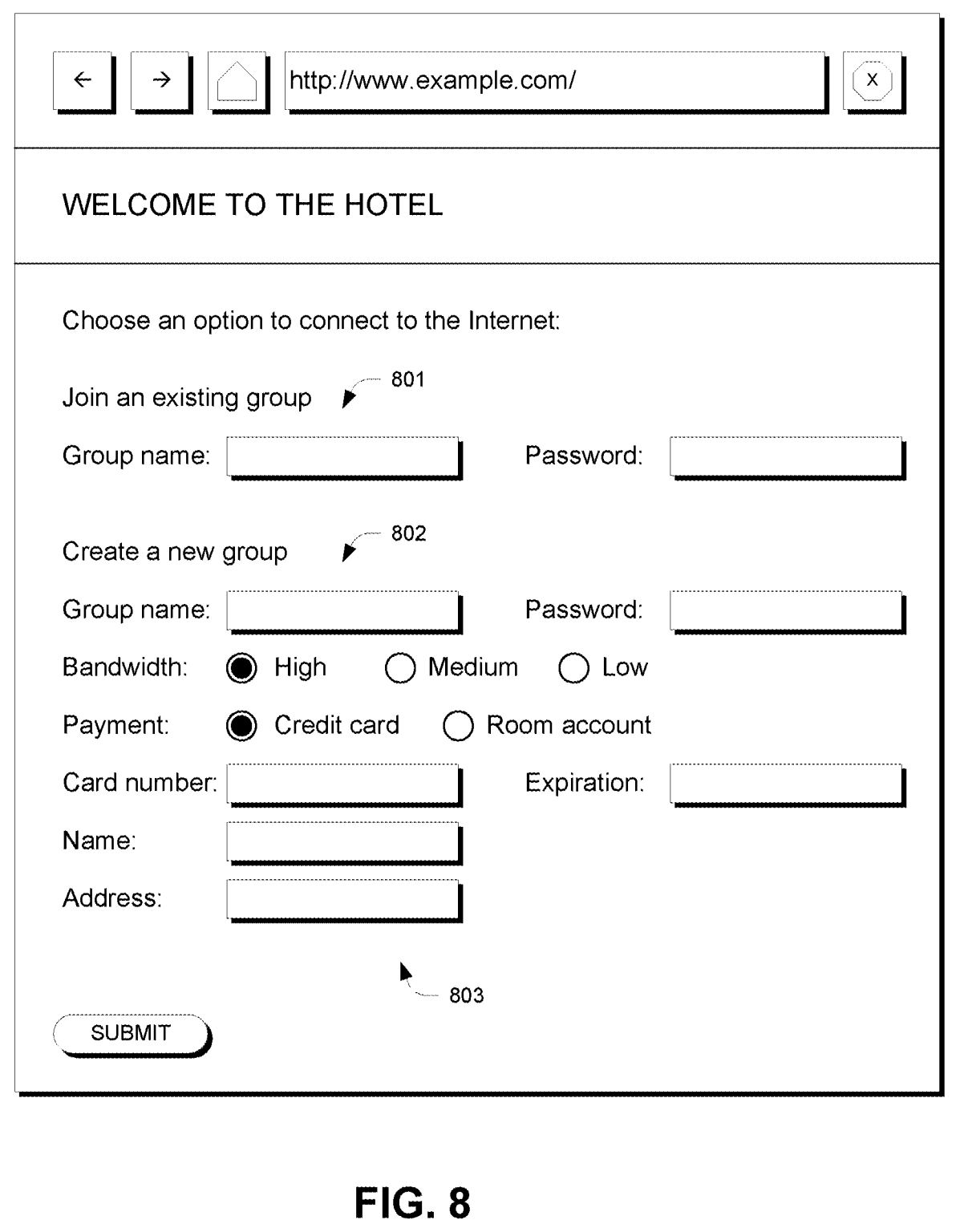

X

WELCOME TO THE HOTEL

Choose an option to connect to the Internet:

Join an existing group

801

Group name:

Password:

Create a new group

802

Group name:

Password:

Bandwidth: High Medium Low

Payment: Credit card Room account

Card number:

Expiration:

Name:

Address:

803

SUBMIT

FIG. 8

| MAC | 01:23:45:67:89:AB |
| --- | --- |
| IP | 10.0.0.17 |
| Port | 0 |
| Room | |
| User | g512 |
| Group BW policy | 512 |
| Bandwidth Up/Down | 512/1024 |
| Throughput Up/Down | 0-0 / 0-0 |
| AAA State | Valid |
| Expiration | Radius: Unlimited |
| Idle Timeout | None |
| Bytes Sent | 10254072 |
| Bytes Received | 265214037 |
| Total | 275468109 |
| Proxy | OFF |

SYSTEMS AND METHODS FOR GROUP BANDWIDTH MANAGEMENT IN A COMMUNICATION SYSTEMS NETWORK

CROSS-REFERENCE TO RELATED APPLICATIONS

This application is a continuation of U.S. patent application Ser. No. 16/399,855, filed Apr. 30, 2019, which is a continuation of U.S. patent application Ser. No. 14/832,945, filed Aug. 21, 2015, now Abandoned, which is a continuation of U.S. patent application Ser. No. 13/352,255, filed Jan. 17, 2012, now U.S. Pat. No. 9,118,578, issued Aug. 25, 2015, which claims the benefit of priority to U.S. Prov. Pat. App. No. 61/433,908, filed Jan. 18, 2011. This application is related to, but does not claim priority to, U.S. Pat. Nos. 6,636,894, 7,194,554, 7,689,716, 7,698,432, and 7,739,383. All of the aforementioned patents and applications are hereby incorporated by reference as if set forth herein in their entireties.

BACKGROUND OF THE INVENTION

The field of communication systems network management is widely practiced. In today's global mobile world, network access is practically a requirement for daily life. As the number of people seeking access to networks continues to increase, the demand for reliable mechanisms for network owners to efficiently and effectively manage their resources increases as well.

There is a need for a network operator to limit total bandwidth on a per-subscriber basis when the subscriber has multiple physical devices. For example, consider a network communication system operated in a hotel. The modern business traveler staying in the hotel may use a laptop, a tablet computer, and a smartphone. Each of these devices is configurably operable to access a network. This business traveler can access the hotel network with each device but may be required to purchase access for each individual device. Alternatively, the network operator can allow all the devices onto the network using a single subscription, but the operator has no control over the aggregate bandwidth consumed by the single subscriber. In other words, the present art does not provide a way for the hotel network communication system operator to limit the bandwidth to the group of devices for a particular subscriber, which, in this example, is the business traveler.

SUMMARY OF THE INVENTION

The present disclosure provides a solution to the above problem by allowing a network management system to allocate a section of bandwidth that can be shared among multiple devices. For example, the above described traveler can purchase a single network subscription which will allocate a certain amount of bandwidth to that subscriber. The traveler can then choose to use all of the bandwidth for his laptop or the traveler can add his other network enabled devices to his subscription and share his allocated bandwidth. The network will then manage all of his devices such that the combined bandwidth used at any given time by all of the included devices does not exceed the traveler's bandwidth maximum. Allocation of bandwidth between devices can be performed dynamically by the network administration or the network user (e.g., the traveler) can choose to allocate the allotted bandwidth between the devices on his subscription. In an embodiment, a user can associate a number of devices with an account such that the next time the user purchases a subscription, all of his devices will be recognized and he does not have to authorize each device again.

The present disclosure also describes a way for a network operator to limit total bandwidth allotted to an event (e.g., conference, baseball game) serving multiple subscribers (e.g., conference attendees, season ticket holders). For example, consider a network communication system operated at a convention center. Conference organizers may desire to provide network access to attendees. As with the hotel network operator, the convention center network operator can allocate bandwidth for each attendee. This solution is generally cumbersome and usually involves assigning each attendee the same bandwidth rather than aggregating the bandwidth allocated for the event to a group of subscribers. The present disclosure provides a system for allowing the conference organizers to group attendees together and allocate blocks of bandwidth between attendees. For example, general attendees may be allocated to a block of bandwidth that is pooled and shared while conference presenters or VIPs are allocated to a second block of bandwidth that provides, generally speaking, more bandwidth per user.

One innovative aspect of the subject matter described in this disclosure can be implemented in a method for managing a communication systems network comprising, receiving a signal, associating the signal with a host, identifying a group policy for the host, transforming the signal according to the group policy for the host, and transmitting the signal according to the group policy for the host.

An embodiment is a method of managing bandwidth, performed by a computing system. The system receives user-selected connection parameters associated with a subscriber device. The system associates a network identifier of the subscriber device with a group bandwidth policy, based on the user-selected connection parameters. The system stores, in computer-readable storage media, parameters associated with the group bandwidth policy, in association with the network identifier of the subscriber device. The system receives, at a gateway device, network communication data from the subscriber device. The system limits, at the gateway device, bandwidth available to the network communication data, based on the stored parameters associated with the group bandwidth policy.

In an embodiment, the network identifier comprises a MAC address of the subscriber device.

In an embodiment, the parameters associated with the group bandwidth policy comprise a group bandwidth policy identifier, an uplink bandwidth, and a downlink bandwidth.

In an embodiment, the system associates a second network identifier of a second subscriber device with the group bandwidth policy. The system limits bandwidth available to the subscriber device and the second subscriber device based on the stored parameters associated with the group bandwidth policy.

In an embodiment, the user-selected connection parameters are received at a portal page server.

An embodiment is a network system configured to manage bandwidth of subscribers with multiple subscriber devices connected to the network system. The network system includes a gateway device configured to connect a plurality of subscriber devices to an external network. The gateway device comprises a computer processor and one or more network ports. The network system includes an Authentication, Authorization and Accounting (AAA) server storing data relating to a group bandwidth policy associated with a subset of the subscriber devices. The gateway device is configured, upon receiving a communication request from a subscriber device, to transmit a request for authentication information to the AAA server. The request comprises a network identifier associated with the subscriber device. The AAA server is configured to determine, in response to the request for authentication information, that the subscriber device is associated with the group bandwidth policy, based at least in part on the network identifier associated with the subscriber device; the AAA server further configured to transmit, to the gateway device, an authentication response comprising the data relating to the group bandwidth policy. The gateway device is further configured to limit the bandwidth available to the subscriber device based upon the data relating to the group bandwidth policy, and further based upon the bandwidth being used by other subscriber devices associated with the group bandwidth policy.

In an embodiment, the gateway device and AAA server are housed within a single device.

In an embodiment, the gateway device and AAA server are separate devices.

In an embodiment, the network system also includes a portal page server configured to complete an enrollment procedure with the subscriber device. The AAA server is configured to determine that the subscriber device is associated with the group bandwidth policy based at least in part on data stored by the portal page server in response to the enrollment procedure.

In an embodiment, the request for authentication information comprises a RADIUS or Diameter protocol request, and the authentication response comprises a RADIUS or Diameter protocol response.

In an embodiment, the gateway device is further configured to limit the bandwidth available to the subscriber device by queuing one or more packets received from the subscriber device.

An embodiment is a method of associating a group of network enabled computers with a network access subscription. A system associates a device network identifier for each of a plurality of network devices with a single network access subscription. The system allocates a subset of available bandwidth with the single network access subscription. The system provides network access to the plurality of network devices. The plurality of network devices share the allocated subset of available bandwidth.

In an embodiment, the device network identifier comprises a MAC address.

In an embodiment, the subset of available bandwidth comprises a subset of available uplink bandwidth and a subset of available downlink bandwidth.

In an embodiment, the method is performed at a network system comprising a gateway device. The plurality of devices are connected to the network system, and wherein the plurality of network devices share the allocated subset of available bandwidth by the gateway device delaying transmission of data packets received from the plurality of network devices.

In an embodiment, associating a network device identifier for each of a plurality of network devices with a single network access subscription comprises storing, in computer-readable storage, the network device identifier for each of the plurality of network devices, in association with an identifier of the single network access subscription.

An embodiment is a network system which associates a plurality of devices with a single network subscription. The system includes one or more device side interfaces for communicating with a plurality of user devices. The system includes one or more network side interfaces for communicating with a wide area network. The system includes one or more processors configured to associate at least two of the plurality of user devices with a single network subscription. The network subscription provides a subset of available bandwidth to be shared by the at least two of the plurality of user devices.

In an embodiment, the system also includes a portal page server configured to receive enrollment data from at least one of the plurality of user devices. The portal page server is configured to cause the one or more processors to associate the at least one of the plurality of user devices with the single network subscription based on the received enrollment data.

In an embodiment, the one or more processors are further configured to limit the bandwidth of data transmitted or received at the one or more device side interfaces from the at least two of the plurality of user devices, based at least in part on an indication of a user-selected bandwidth level associated with the single network subscription.

In an embodiment, the one or more processors are further configured to dissociate a user device from the single network subscription in response to a determination that the user device has disconnected.

BRIEF DESCRIPTION OF THE DRAWINGS

FIG. 8 is a sample user interface for selecting a group bandwidth enrollment as used in an embodiment.

DETAILED DESCRIPTION OF THE PREFERRED EMBODIMENT

Details of embodiments of the subject matter described in this specification are set forth herein. Other features, aspects, and advantages will become apparent from the description, the drawings, and the claims.

In an embodiment, an "enrollment" is an instance of purchased service. Examples of enrollment include: 1) an individual subscriber purchasing network access for a chosen duration of time; and 2) purchasing of network access for an event (e.g., conference, baseball game) shared by a group of subscribers.

In an embodiment, a "session" is an authorization for a single subscriber device to access the network. For example, an enrollment may: 1) authorize ability to create multiple sessions for an individual subscriber; or 2) authorize a group of subscribers to authenticate using the same credentials.

Figure 1:
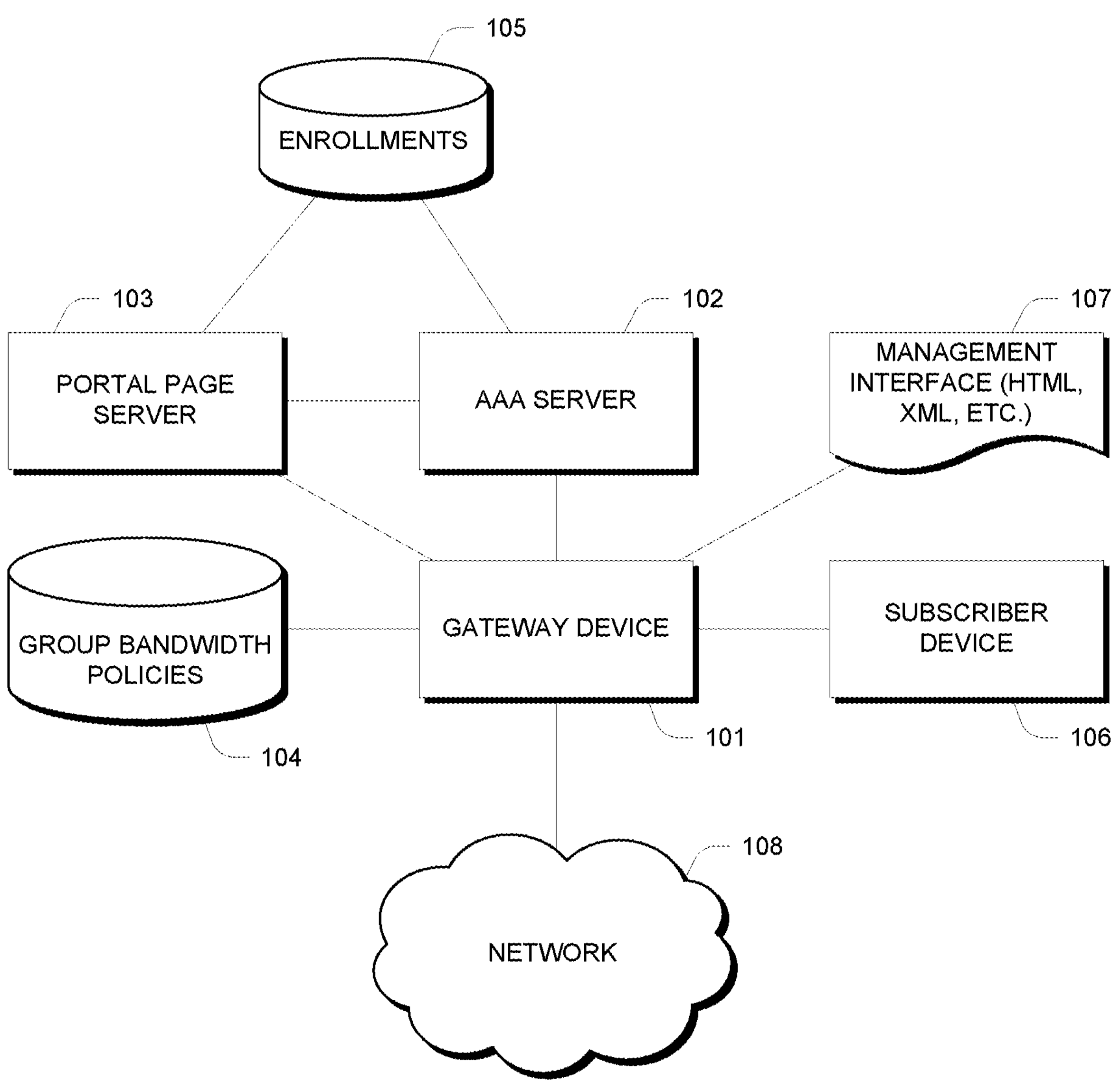
FIG. 1 is a block diagram of a computing system as used in an embodiment.

FIG. 1 is a block diagram of a computing system as used in an embodiment of the invention. The system may include gateway device 101, Authentication, Authorization, and Accounting (AAA) server 102, and portal page server 103. The system may be connected to one or more networks 108, as well as one or more subscriber devices 106. The system may further include one or more data sources, such as group bandwidth policies data 104 and enrollments data 105. In various embodiments, the computing devices, such as gateway device 101, AAA server 102 and portal page server 103, may be housed in a single device or in separate devices, or any combination thereof. Additional components may be included, such as a Property Management System (PMS) to receive and/or provide user account information.

In an embodiment, the devices of the system are connected via a local area network (LAN) that is connected to an external network 108, such as the Internet, via a gateway device 101. In other embodiments, one or more components of the system may be external to the local area network. For example, portal page server 103 and/or AAA server 102 may be connected externally via the Internet. Furthermore, in various embodiments, the components of the system may operate on a different type of network, such as a wide area network, a virtual private network, a corporate intranet, or the like.

Gateway device 101 provides various network services to subscriber device 106, such as, for example, connectivity to external networks 108. In various embodiments, the gateway device may comprise a single device or multiple devices. Some of the services that may be provided by gateway device 101 are described in U.S. Pat. No. 7,194,554, which is hereby incorporated by reference. Any subset of those services, or any other services, may be provided, in an embodiment. In the embodiment of FIG. 1, the gateway device is located between subscriber devices 106 and external networks 108. In other embodiments, the gateway device may be arranged in a different network topology, and may not be located between subscriber devices 106 and external networks 108. For example, an intermediary network device may be used to connect subscriber devices 106 and external networks 108, and that intermediary network device may communicate some or all network communications to gateway device 101. Thus, the gateway device is not necessarily limited to being a "gateway" as understood in the art of computer networks, and it is not necessarily limited to being a single device. In some embodiments, the gateway functionality described herein and can shared by a distributed group of devices or network system.

In an embodiment, gateway device 101 is configured to limit the bandwidth available to subscriber device 106 in accordance with one or more group bandwidth policies. A "group bandwidth policy" enables a subscriber to purchase or otherwise obtain a user-selected bandwidth or quality of service for multiple subscriber devices. For example, a subscriber having one or more network devices, such as laptops, mobile phones, tablet computers, and the like, may purchase a certain amount of bandwidth to be allocated for all of the subscriber's devices in total. Gateway device 101 may employ packet delaying, queuing, and/or dropping strategies in order to limit bandwidth, as described in detail in U.S. Pat. No. 7,739,383, which is hereby incorporated by reference.

In an embodiment, bandwidth limitations resulting from group bandwidth policies or other bandwidth policies are based on user selections which may be unrelated to the total bandwidth available. For example, the gateway device 101 may be able to communicate at a speed of 10 Mbps with networks 108 and subscriber devices 106. If no bandwidth limitations were present, then subscriber devices 106 would be able to communicate with networks 108 at the full speed of 10 Mbps. However, if a subscriber device is associated with a group bandwidth policy that is limited to a speed of 2 Mbps, then that subscriber device may be limited to 2 Mbps, even if further bandwidth is available.

In an embodiment, if two or more devices are associated with a group bandwidth policy limited to 2 Mbps, then the total bandwidth available to those two devices would be 2 Mbps, even if further bandwidth is available, so if one device is using 1.5 Mbps of bandwidth, the other would be limited to a maximum of 0.5 Mbps. In an embodiment, the bandwidth available to subscriber devices associated with a group bandwidth policy may be further limited due to system capacity and constraints. For example, if there are ten subscriber devices, each associated with a separate bandwidth policy of 2 Mbps, and the network is limited to 10 Mbps total, then the gateway device 101 or other network system component may determine to allocate 1 Mbps to each subscriber device, or assign some other allocation in accordance with network usage, quality of service parameters, service levels purchased by users, or the like.

While the present disclosure presents implementations including group bandwidth policies for managing the minimum and maximum upstream bandwidth for a group, it will be appreciated that a group bandwidth policy is not limited to these features. It is envisioned that a group bandwidth policy may include other quality of service related parameters such as fairness weights, priority, differentiated services code point, etc.

In an embodiment, gateway device 101 obtains information about a group bandwidth policy to be associated with a subscriber device 106 during an authentication process. Each subscriber device 106 connected to gateway device 101 may be associated with a group bandwidth policy. Alternately, a subscriber device 106 may be associated with an individual bandwidth policy or some other policy, or even no policy at all. The appropriate bandwidth policy information may be obtained by gateway device 101 from AAA server 102. The gateway device may further store information relating to group bandwidth policies in data repository 104. Other bandwidth information, as well as other subscriber information, may be stored in repository 104, which may be internal or external to the gateway device.

AAA server 102 provides authentication and subscriber information data to other components of the system, such as gateway device 101. AAA server 102 may communicate with these components via any number of standard and/or proprietary network protocols. In various embodiments, AAA server 102 communicates with gateway device 101 using the Remote Authentication Dial In User Service (RADIUS) protocol, the Diameter protocol, an XML protocol, and/or the like. Thus, gateway device 101 may transmit requests for authentication information relating to a subscriber device 106 to AAA server 102. In response, AAA server 102 may provide subscriber information, including group bandwidth policy information, to gateway device 101.

The group bandwidth policy information provided by AAA server 102 may be derived from a data source, such as enrollments data repository 105. This data repository may contain information about subscriber enrollments. For example, in an embodiment, a subscriber may purchase a certain level of bandwidth or service for multiple computing devices used by that subscriber. The information about the service package purchased by the subscriber may be stored in enrollments repository 105. Thus, the subscriber's purchase information may be obtained by AAA server 102 and used to determine an appropriate group bandwidth policy for a subscriber device 106 associated with a particular subscriber.

In an embodiment, data repositories 104 and/or 105 may be maintained in memory or other non-transitory computer-readable media such as a storage drive. The data may be formatted, for instance, in a relational database or a data file (e.g., XML). In an embodiment, data repositories 104 and/or 105 may feature an indexed collection of group bandwidth policies. All subscribers sharing the same group bandwidth policy identifier belong to the same group.

In an embodiment, the system enables a subscriber device to be associated with one or more bandwidth-limiting groups, such as multiple group bandwidth policies, a group bandwidth policy and an individual bandwidth policy, and the like. Conflicts between multiple groups may be configurably resolved. For example, the system may be configured to use the lowest bandwidth setting from among multiple groups associated with a subscriber device, it may be configured to prefer group bandwidth policies over individual bandwidth policies or vice versa, it may be configured to prompt the user to select a policy, or the like.

Portal page server 103 may provide authentication and/or enrollment services to subscribers. For example, a subscriber wishing to purchase or otherwise obtain network access may communicate information to portal page server 103, such as authentication information, payment information, hotel room information, or the like. Portal page server 103 may use this information to determine an appropriate level of service, such as a bandwidth level, for the subscriber and store information relating to that level of service in enrollments repository 105.

In an embodiment, a subscriber device 106 accesses portal page server 103 in response to a redirection procedure that occurs when subscriber device 106 attempts to connect to an external network or network location. One such process of redirection is described in detail in U.S. Pat. No. 7,194,554, which is hereby incorporated by reference.

The components of the system, such as gateway device 101, AAA server 102, and/or portal page server 103, may be configured to provide a management interface so that administrators of the system may determine information about the system's usage. For example, gateway device 101 may present a management interface 107 to authorize system administrators. The management interface may provide information such as, for example, group bandwidth policies installed in repository 104, information about subscriber devices 106 that are connected, information about enrollments stored in repository 105, and the like. Management interface 107 may present data in a variety of formats, such as an HTML interface, an XML data feed, and the like.

Figure 2:
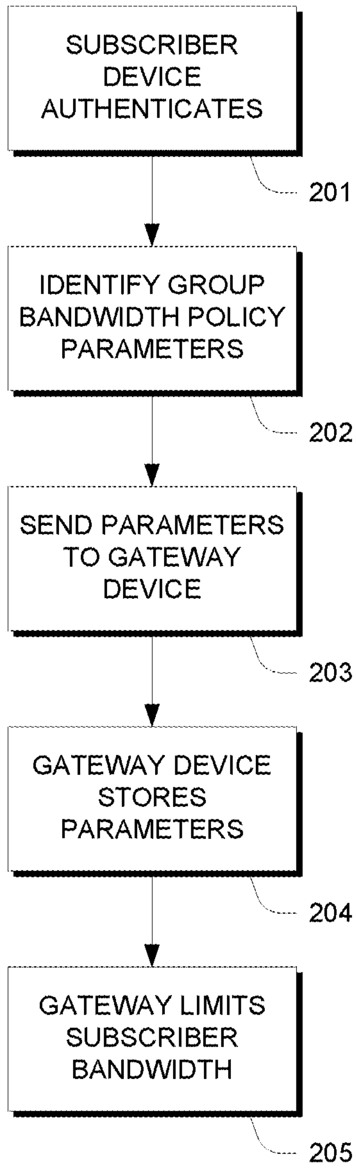
FIG. 2 is a flow chart of a process of implementing a group bandwidth policy as used in an embodiment.

FIG. 2 is a flow chart of a process of implementing a group bandwidth policy as used in an embodiment. The process may be performed on a system, such as that shown in FIG. 1.

At block 201, a subscriber device 106 authenticates with portal page server 103. The authentication information may include identity information and/or billing and payment information, and it may identify a user-selected level of service. This level of service may be, for example, on individual bandwidth policy or a group bandwidth policy. The selected policy may include a selection of a maximum uplink bandwidth and/or a maximum downlink bandwidth. Thus, the bandwidth for data transmitted by the subscriber and data received by the subscriber may be limited differently. The user may select the particular bandwidth speeds in an embodiment, or the user may select from a list of predefined bandwidth options.

At block 202, the portal page server 103 identifies group bandwidth policy parameters. These parameters are determined based on the authentication information or other information provided by the subscriber device at block 201. The authentication information from block 201 may indicate that a new group bandwidth policy is to be created in conjunction with a new enrollment. In such a case, portal page server 103 may store new enrollment information in data repository 105 or otherwise communicate such policy information to AAA server 102.

In an embodiment, a subscriber selects a group bandwidth policy by providing group identification information (e.g., credentials, group name, group identifier, group password) to the system. In an embodiment, the MAC address of the subscriber's device is associated with the group bandwidth policy in advance of network access thereby allowing the device to easily access the network as part of the group bandwidth policy.

In an embodiment, the authentication information from block 201 may indicate that the subscriber device is to be associated with an existing group bandwidth policy. In such a case, at block 202, the appropriate policy is identified and information identifying the subscriber device is associated with that policy. Thus, in an embodiment, AAA server 102 has access to information relating to group bandwidth policies and information relating to associations between subscriber devices and group bandwidth policies. The association with a subscriber device may be based on a MAC address, IP address, circuit ID, mobile phone identifier, or the like.

At block 203, the group bandwidth policy parameters from block 202 are sent to gateway device 101. In various embodiments, the parameters may be sent immediately after they are determined at block 202, or they may be sent in response to a request by the gateway device. The latter embodiment may be used, for example, where the gateway device 101 and AAA server 102 communicate via a RADIUS or Diameter protocol.

At block 204, gateway device 101 stores the group bandwidth policy parameters—for example, in data repository 104. In an embodiment, the gateway device first determines whether the group bandwidth policy is already stored in repository 104. This may be the case, for example, where a subscriber is connecting a second device to the network and the appropriate group bandwidth policy is already stored in repository 104 due to the subscriber's first device. In such a case, the gateway device may, in an embodiment, update the group bandwidth policy information stored in repository 104 if it detects that there have been any changes. Furthermore, gateway device 101 may be configured to remove group bandwidth policy information from repository 104 when gateway device 101 determines that such information is no longer necessary—for example, when all subscriber devices associated with a particular group bandwidth policy have disconnected from the network.

Updating a group bandwidth policy may be necessary, for example, if during system operation, a group policy changes (e.g., revision to maximum bandwidth). An example of an event causing the change is the subscriber purchases additional bandwidth for the group. The network operator changing the allocated bandwidth for the group, manually or dynamically according to configurable parameters, is also an event in an example implementation that would cause the group policy to change. In an embodiment, when the group policy changes the change is communicated to all sessions for the group, for example, via AAA server 102 or gateway device 101.

At block 205, gateway device 101 proceeds to limit the bandwidth available to subscriber device 106, in accordance with the group bandwidth policy parameters received at block 203 and stored at block 204. The gateway device may use any of a variety of algorithms to perform this bandwidth limitation, such as queuing, delaying, and/or dropping packets. Where multiple subscriber devices are associated with a single group bandwidth policy, gateway device 101 may apply various strategies for allocating the available bandwidth among those devices, in various embodiments. For example, the gateway device may employ a "best effort" strategy in which it treats all data to and from the devices associated with a particular policy as if that data were being transmitted to and from a single device, and limits the bandwidth accordingly. In other embodiments, the subscriber may be given the option of allocating the available bandwidth among the subscriber's devices. For example, the subscriber may choose to allocate the bandwidth evenly among the subscriber's devices, or to allocate more bandwidth to one device and less bandwidth to other devices. In a further embodiment, gateway device 101 may determine the likely or probable bandwidth usage of various subscriber devices and allocate bandwidth accordingly. For example, gateway device 101 may determine that a laptop is likely to require more bandwidth than a mobile phone and accordingly allocate more bandwidth to the laptop than to the mobile phone.

Figure 3:
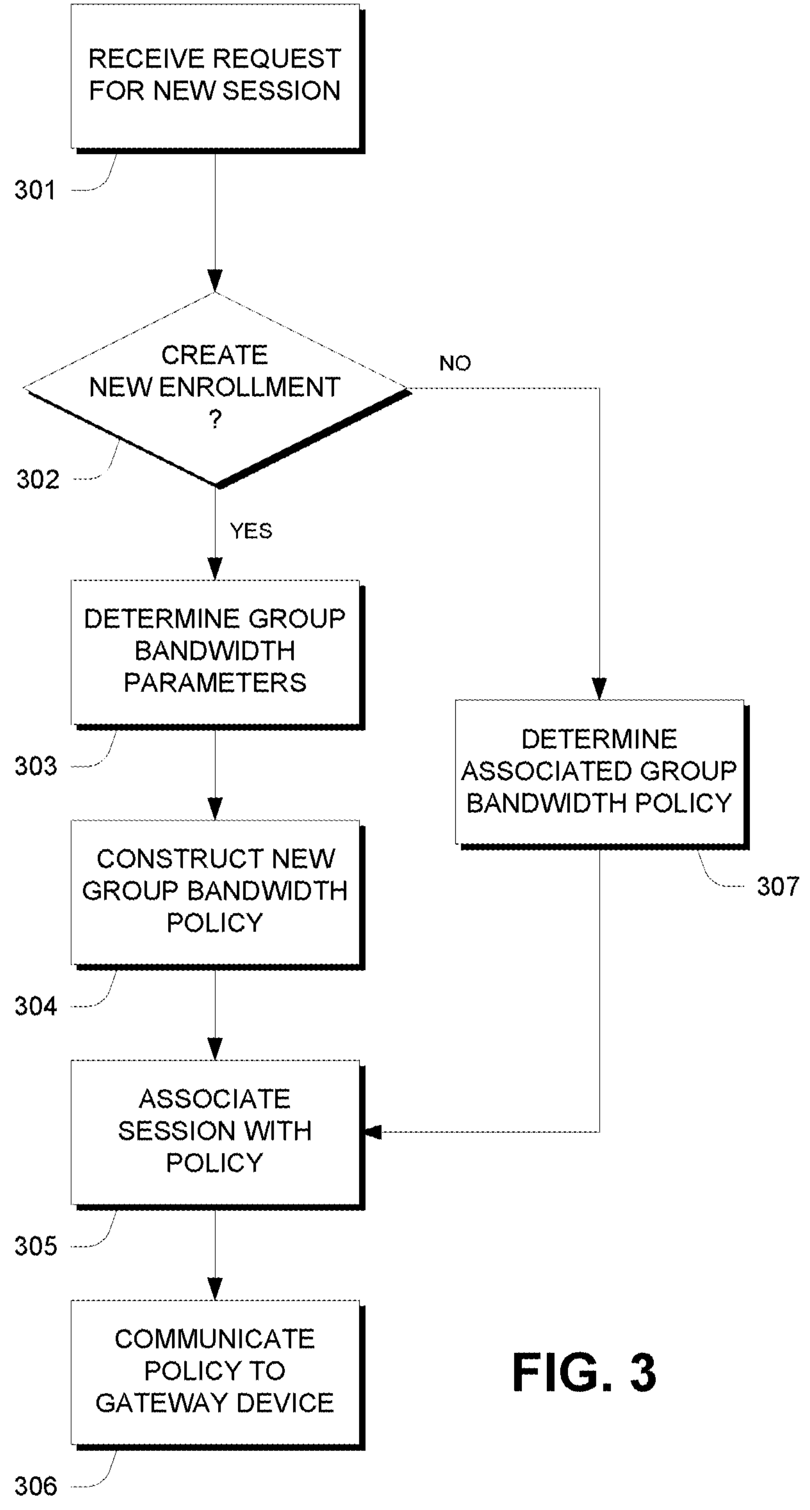
FIG. 3 is a flow chart of a process of creating a session for a subscriber device as used in an embodiment.

FIG. 3 is a flow chart of a process of creating a session for a subscriber device, as used in an embodiment. The process may be performed, for example, at portal page server 103, shown in FIG. 1. The process of FIG. 3 may be performed, for example, when a subscriber device first connects to a network. Thus, it may be performed, for example, at block 201 of FIG. 2.

At block 301, portal page server 103 receives a request for a new session transmitted by subscriber device 106. This request for a new session may be transmitted by the subscriber device in response to a redirection procedure performed when subscriber device attempts to connect to an external network location. The request may further include information transmitted from subscriber device 106 to portal page server 103 via one or more web pages or other network communications subsequent to the redirection procedure. Alternately, the request may be received when the subscriber device directly contacts the portal page server. The request may be transmitted via HTTP or other network protocols, in various embodiments.

At block 302, the portal page server 103 determines whether to create a new enrollment based on the request from block 301. For example, the request may identify on existing enrollments with which the subscriber device wishes to be associated. Alternatively, the request may include information for creating a new enrollment if the subscriber has not yet connected any other devices to the network.

If, at block 302, the portal page server determines that a new enrollment is to be created, then at block 303, the portal page server determines group bandwidth parameters to be associated with the enrollment. The parameters may be determined based on a selection of a group bandwidth policy at block 301. In an embodiment, the subscriber may opt for a policy different from a group bandwidth policy, such as an individual bandwidth policy, or no policy at all. In such a case, the portal page server would take appropriate actions based on the subscriber's selection.

At block 304, the portal page server constructs a new group bandwidth policy in accordance with the parameters determined at block 303. This new group bandwidth policy may be stored, for example, in enrollments data repository 105. The portal page server 103 then goes on to associate a new session involving the subscriber device 106 with the newly created policy at block 305.

If, at block 302, the portal page server 103 determines not to create a new enrollment, then at block 307, the portal page server 103 determines an appropriate group bandwidth policy to be associated with the subscriber device. The portal page server 103 may determine that no group bandwidth policy is to be associated with the subscriber device—for example, when the subscriber has selected an individual bandwidth policy or no bandwidth policy at all. In such cases, the portal page server acts accordingly. If, however, an appropriate group bandwidth policy is determined at block 307, then the portal page server proceeds to block 305 and associates the determined group bandwidth policy from block 307 with the subscriber device 106 in a new session.

At block 306, the portal page server communicates the group bandwidth policy to gateway device 101. This may be done directly or in response to a request from the gateway device. Accordingly, the gateway device will have information relating to the group bandwidth policy and it will be able to limit the subscriber device's bandwidth accordingly.

Although the process of FIG. 3 has been described with respect to a portal page server 103, it may be performed by a combination of devices. For example, the AAA server 102 may perform one or more of the blocks of FIG. 3. In one embodiment, the AAA server performs blocks 305 and 306. In one embodiment, the AAA server performs blocks 302-304 and 307.

Enrollments may be created via a process such as that described in FIG. 3, or by other means. For example, an administrator of the network system may create an enrollment with an associated group bandwidth policy and store it directly in the system. This may be useful, for example, where the group bandwidth policy is to be applied to a large meeting, such as a conference or convention, in which case it is desirable to have the group bandwidth policy installed and activated prior to the meeting.

Figure 4:
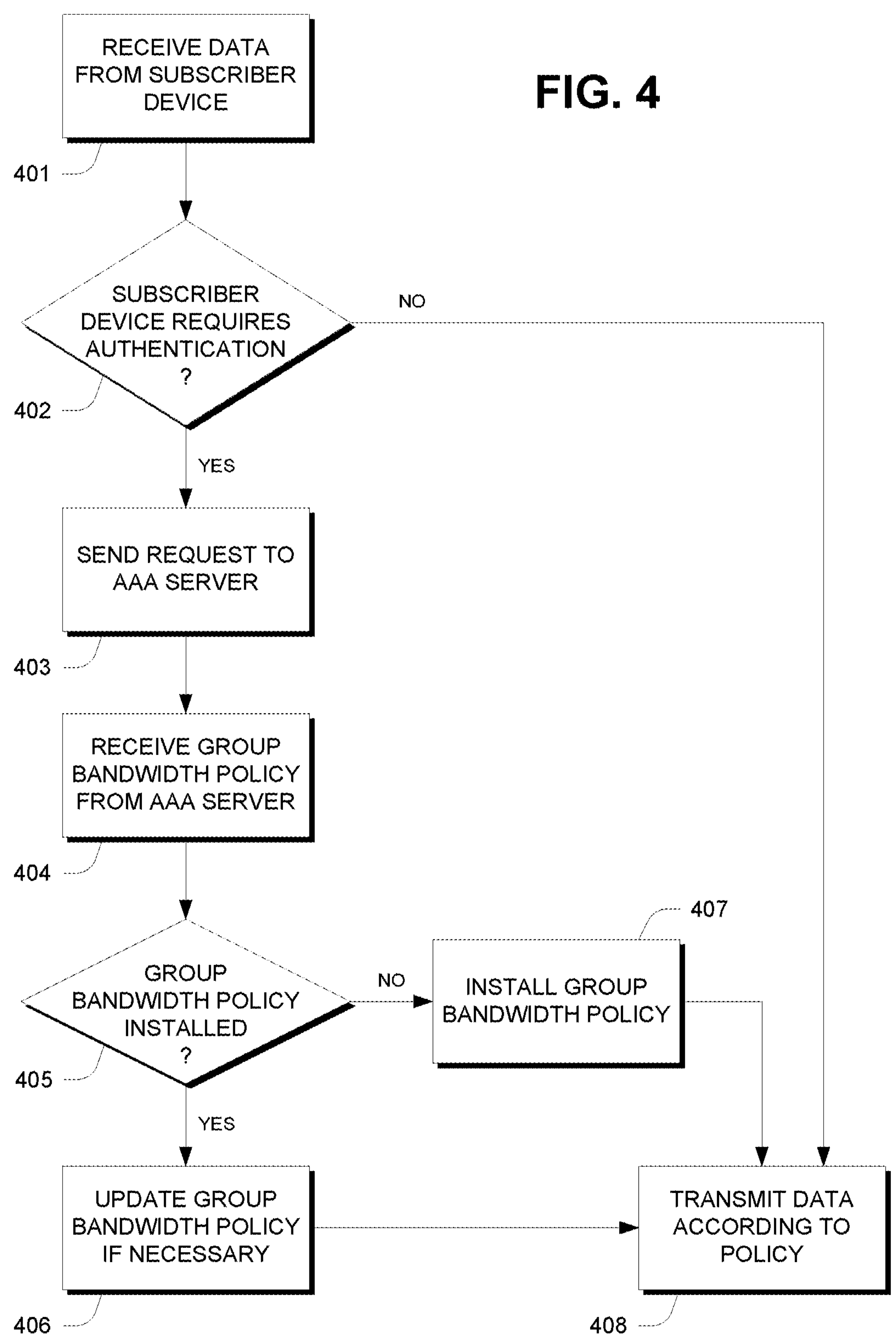
FIG. 4 is a flow chart of a process of authenticating data sent by a subscriber device as used in an embodiment.

FIG. 4 is a flow chart of a process of authenticating data sent by a subscriber device as used in an embodiment. The process may be performed, for example, at gateway device 101 of FIG. 1. In an embodiment, the process of FIG. 4 is performed when subscriber device 106 sends a request directed to an external network location for the first time subsequent to creating a session according to the process of FIG. 3, or at every time that data is received by the gateway device.

At block 401, gateway device 101 receives data from subscriber device 106. In an embodiment, the data may relate to a request directed to an internal or external network location. The data may be directed to the gateway device or it may be directed to another network component which is configured to forward such data to the gateway device.

At block 402, the gateway device 101 determines whether the subscriber device 106 requires authentication. It may make this determination, for example, based on whether there is a group bandwidth policy or other bandwidth policy associated with the subscriber device 106 stored in data repository 104, or if it was previously authenticated. If gateway device 101 determines that no authentication is required, then the data received at block 401 is transmitted at block 408 in accordance with any group bandwidth or other policy associated with subscriber device 106. The association between the subscriber device and the group bandwidth policy may be determined, for example, based on an association between the two stored in the gateway device.

If gateway device 101 determines that the subscriber does require authentication at block 402, then at block 403, the gateway device sends a request to the AAA server 102. In an embodiment, the request is in the form of a RADIUS or Diameter protocol request. The request may include information identifying the subscriber device, such as a MAC address, IP address, circuit ID, mobile phone identifier, or the like.

At block 404, gateway device 101 receives a response from AAA server 102, which includes a group bandwidth policy. In an embodiment, the received policy includes a policy identifier, a maximum uplink bandwidth, and a maximum downlink bandwidth. Any subset of this information and/or other information may be included in the group bandwidth policy received from the AAA server. The gateway device may alternately receive other information at block 404, such as individual bandwidth policy information, no bandwidth policy information, or an indication that the subscriber device has not authenticated. In the last of those cases, the gateway device may be configured, in an embodiment, to redirect the subscriber device to portal page server 103 so that the subscriber device may complete an authentication process.

At block 405, the gateway device 101 determines whether the group bandwidth policy received at block 404 is already installed—for example, in data repository 104. The gateway device may make this determination based on a group bandwidth policy identifier received at block 404 and/or other forms of referencing the group bandwidth policy, such as a pointer to a memory location. If the gateway device determines that the group bandwidth policy is already installed, then at block 406, the gateway device updates the group bandwidth policy, if necessary. Otherwise, at block 407, the gateway device installs the group bandwidth policy in data repository 104. Finally, at block 408, the gateway device transmits the received data in accordance with the appropriate group bandwidth or other policy.

Figure 5:
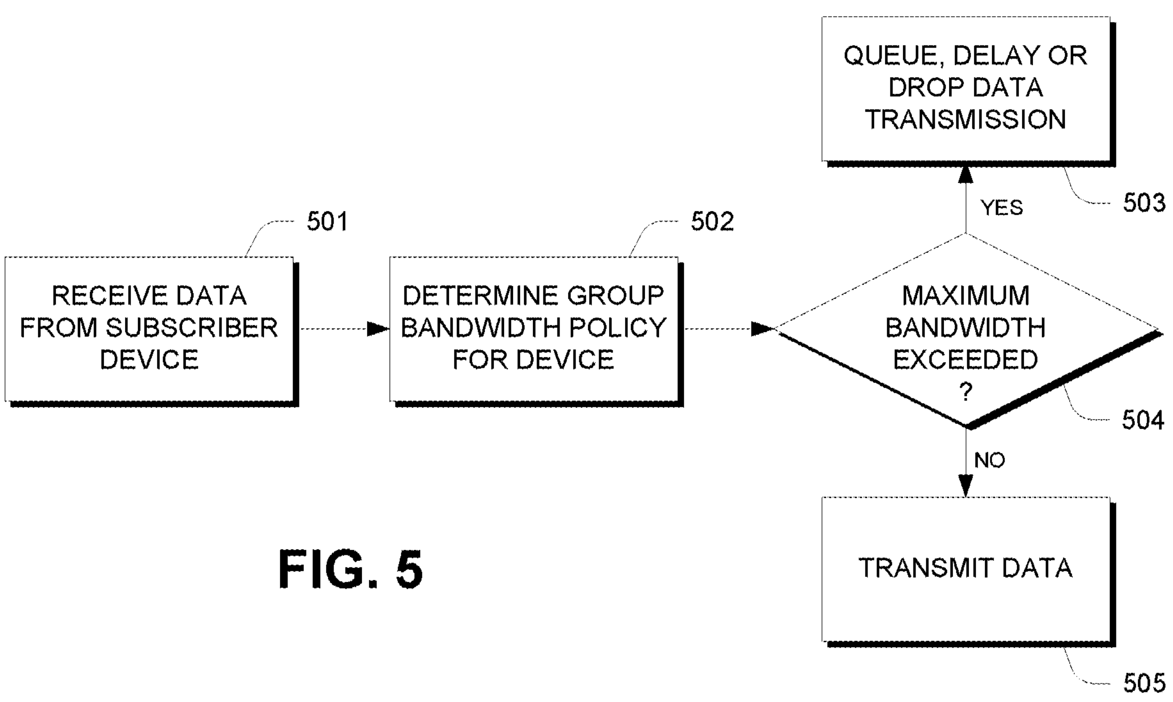
FIG. 5 is a flow chart of a process of handling data received from a subscriber device as used in an embodiment.

FIG. 5 is a flow chart of a process of handling data received from a subscriber device as used in an embodiment. The process may be performed by a gateway device 101, as shown in FIG. 1. The process may be performed, for example, at block 408 of FIG. 4 or at other times when data is received by the gateway device.

At block 501, the gateway device 101 receives data from subscriber device 106. Based on the data received, and information identifying the subscriber device in that data, the gateway device determines a group bandwidth policy for the device at block 502.

At block 504, the gateway device 101 determines a maximum bandwidth based on the group bandwidth policy for the device. In an embodiment, the maximum bandwidth is a maximum uplink bandwidth associated with the group bandwidth policy.

The gateway device determines whether the maximum bandwidth has been exceeded at block 504. If it has been exceeded, then at block 503, the gateway device restricts bandwidth by queuing, delaying, policing, and/or dropping data transmissions, or by other means. However, if the maximum bandwidth has not been exceeded, then at block 505, the gateway device transmits the received data.

Figure 6:
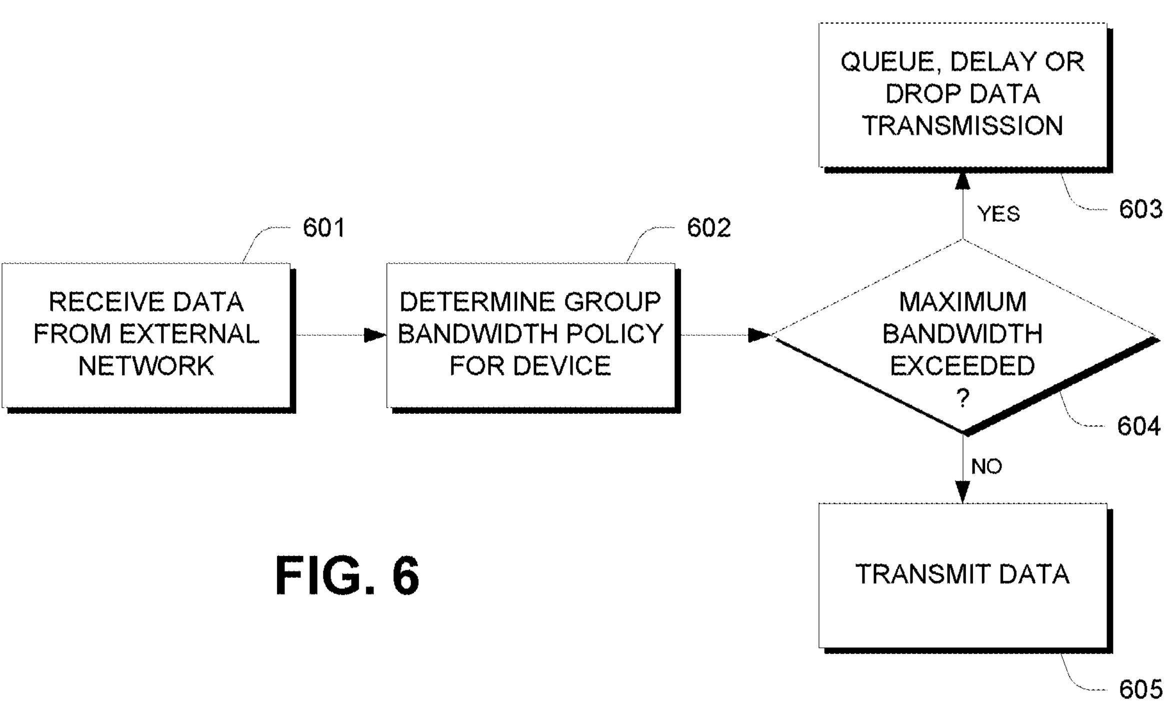
FIG. 6 is a process of handling data received from an external network that is directed to a subscriber device as used in an embodiment.

FIG. 6 is a process of handling data received from an external network that is directed to a subscriber device as used in an embodiment. This process may be performed at gateway device 101 of FIG. 1.

At block 601, the gateway device receives data from an external network. The gateway device determines a subscriber device to which the received data is directed, and then at block 602, the gateway device determines a group bandwidth policy for that device.

The gateway device then determines, at block 604, a maximum bandwidth based on the group bandwidth policy. In an embodiment, the maximum bandwidth is a maximum downlink bandwidth. If, at block 604, the gateway device determines that the maximum bandwidth has been exceeded, then at block 603, the bandwidth is limited by queuing or delaying the data transmission. However, if the maximum bandwidth has not been exceeded, then at block 605, the data received at block 601 is transmitted to the appropriate subscriber device.

Figure 7:
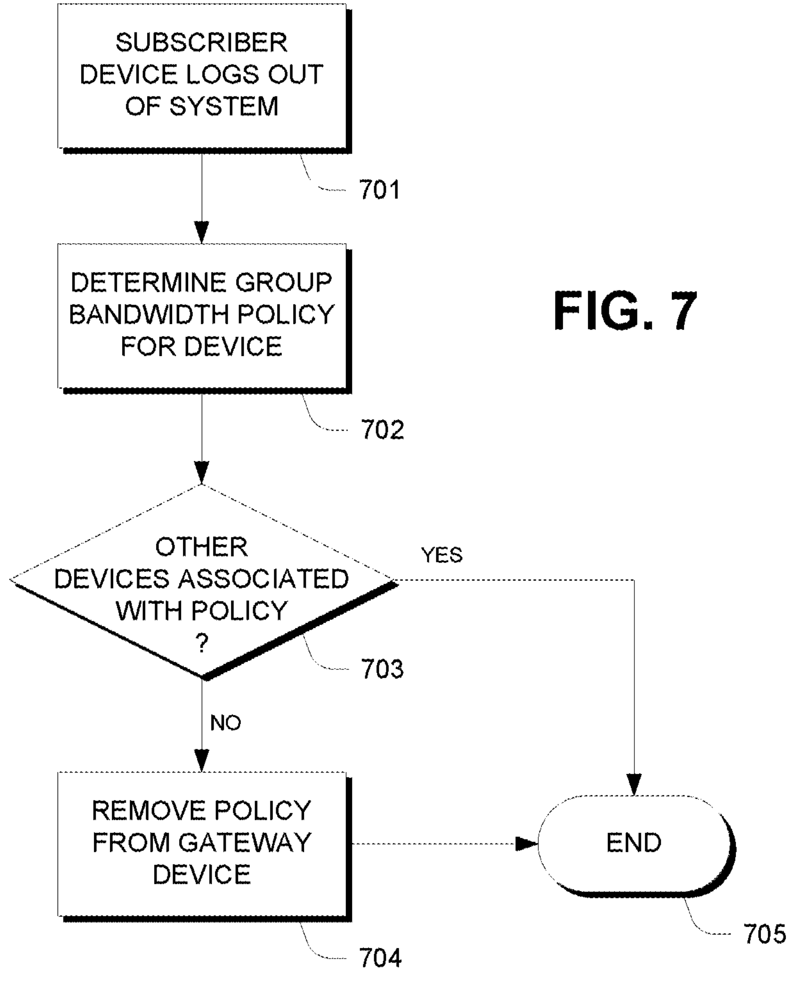
FIG. 7 is a flow chart of a process of managing records of group bandwidth policies as used in an embodiment.

FIG. 7 is a flow chart of a process of managing records of group bandwidth policies as used in an embodiment. The process may be performed at gateway device 101 of FIG. 1 and group bandwidth policy data repository 104.

At block 701, the gateway device 101 determines that a subscriber device has logged out of the network system. The gateway device may make this determination based on an explicit logout command transmitted by subscriber device 106, a session timeout, an idle timeout, a deletion of a subscriber by a system administrator, and the like.

At block 702, the gateway device 101 determines a group bandwidth policy associated with the subscriber device of block 701. If there is no group bandwidth policy associated with the device, then the gateway device acts accordingly. However, if a group bandwidth policy is identified, then the gateway device proceeds, at block 703, to determine whether there are other subscriber devices associated with the same group bandwidth policy. It may make this determination, for example, for querying data repository 104 for subscriber devices associated with the same group bandwidth policy.

If, at block 703, the gateway device 101 determines that there are other devices associated with the group bandwidth policy, then the process terminates at block 705. However, if the gateway device determines that no other subscriber devices are associated with the group bandwidth policy, then at block 704, the gateway device proceeds to remove the group bandwidth policy information. For example, the information may be removed from data repository 104.

The process shown in FIG. 7 thus allows gateway device 101 or other devices of the system to manage records of group bandwidth policies that have been stored. Other methods may be employed, such as, for example, periodically scanning through data repository 104 and removing group bandwidth policy information that is not associated with any connected subscriber.

FIG. 8 is a sample user interface for selecting a group bandwidth enrollment, as used in an embodiment. The interface may be presented to a subscriber device 106 by portal page server 103. It may be presented, for example, during block 301 of FIG. 3.

The user interface enables a user to join an existing group using input elements 801. The user may provide identifying information associated with a group bandwidth policy, such as a group name and/or password. In various embodiments, different types of identifying information may be employed.

A user may also create a new group using interface elements 802. In an embodiment, the user may provide information, such as a group name, password, and selection of a bandwidth level. In various embodiments, different types of identifying information may be employed, such as an access code, a room number, a predefined key provided by a system administrator or other entity, a group secret code, or the like. In an embodiment, the user may further provide payment information using interface elements 803. In various embodiments, additional information and/or any subset of this information, may be requested. In various embodiments, only elements 802 or 803, may be included. The user may then submit the contents of the form shown in FIG. 8 to portal page server 103 or another appropriate server, to thereby create a new session and/or enrollment.

Figure 9:
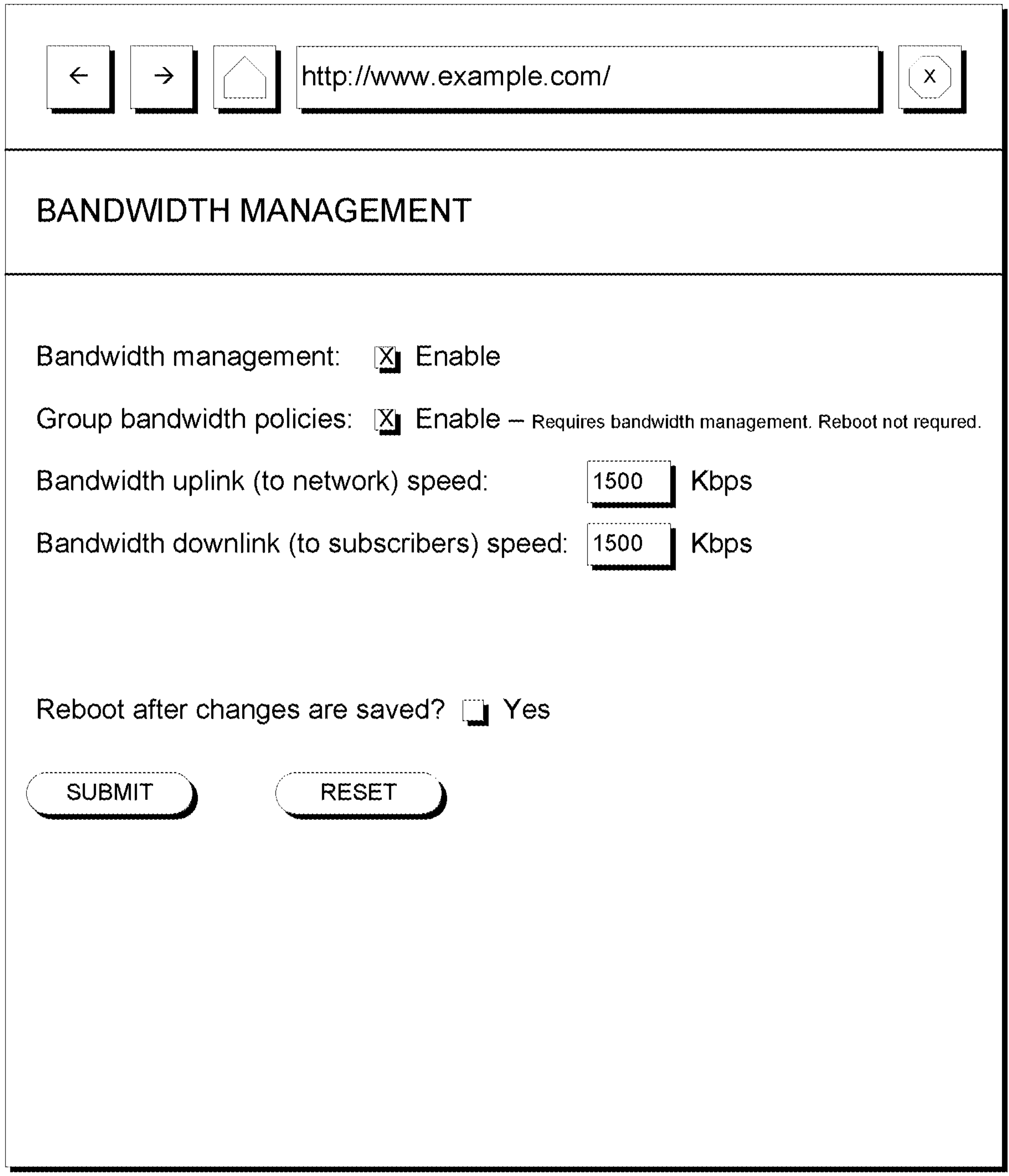
FIG. 9 is a sample user interface used to enable a group bandwidth policy feature according to one embodiment.

FIG. 9 is a sample user interface used to enable a group bandwidth policy feature according to one embodiment. The interface may be presented by gateway device 101 as part of management interface 107 of FIG. 1. Installing a group bandwidth policy involves establishing a group bandwidth policy identifier and other communication network system management properties to associate with the group bandwidth policy (e.g., short name for the group, description of the group, maximum upstream bandwidth, maximum downstream bandwidth, encryption level, group session timeout). In an implementation, the group bandwidth policy is defined through an application interface (e.g., web-service, RMI). The application interface may accept, for example, a document (e.g., XML) containing one or more group bandwidth policy definitions. It will be appreciated that similar interfaces are used to maintain installed groups as well.

Figure 10:
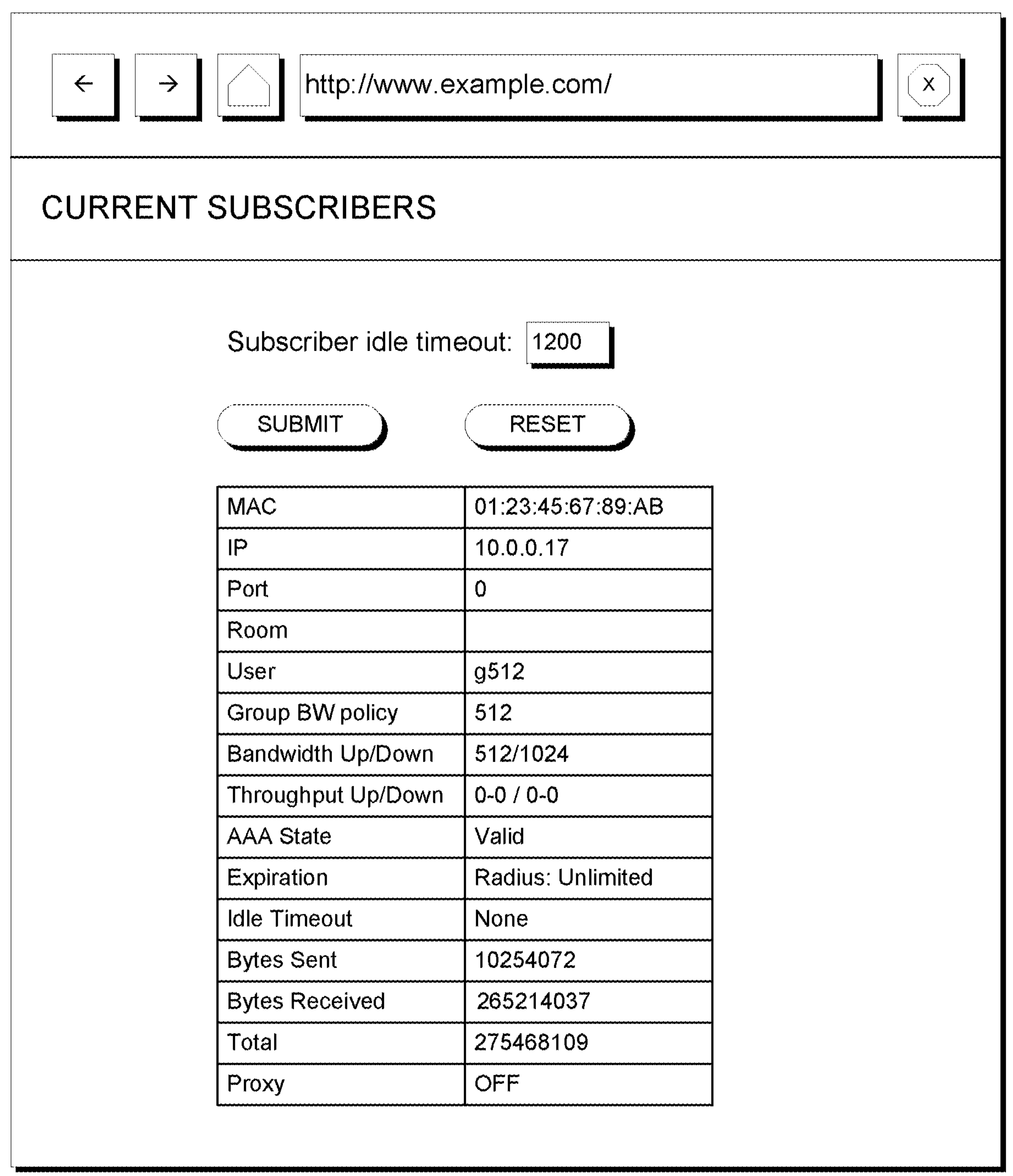
FIG. 10 is a sample user interface used to view information about subscribers for a group according to one embodiment.

FIG. 10 is a sample user interface used to view information about subscribers for a group according to one embodiment. The interface may be presented by gateway device 101 as part of management interface 107 of FIG. 1. The user interface shows a variety of data including the identity of the device, the IP address, the port, a user name, the group policy, the bandwidth, the throughput, the authentication (AAA) state, expiration, idle timeout, bytes sent, bytes received, total bytes, and the proxy in use. In an example implementation, a similar interface displays the same information, but aggregated, for example, at the group level to show all subscribers affiliated with the group.

Figure 11:
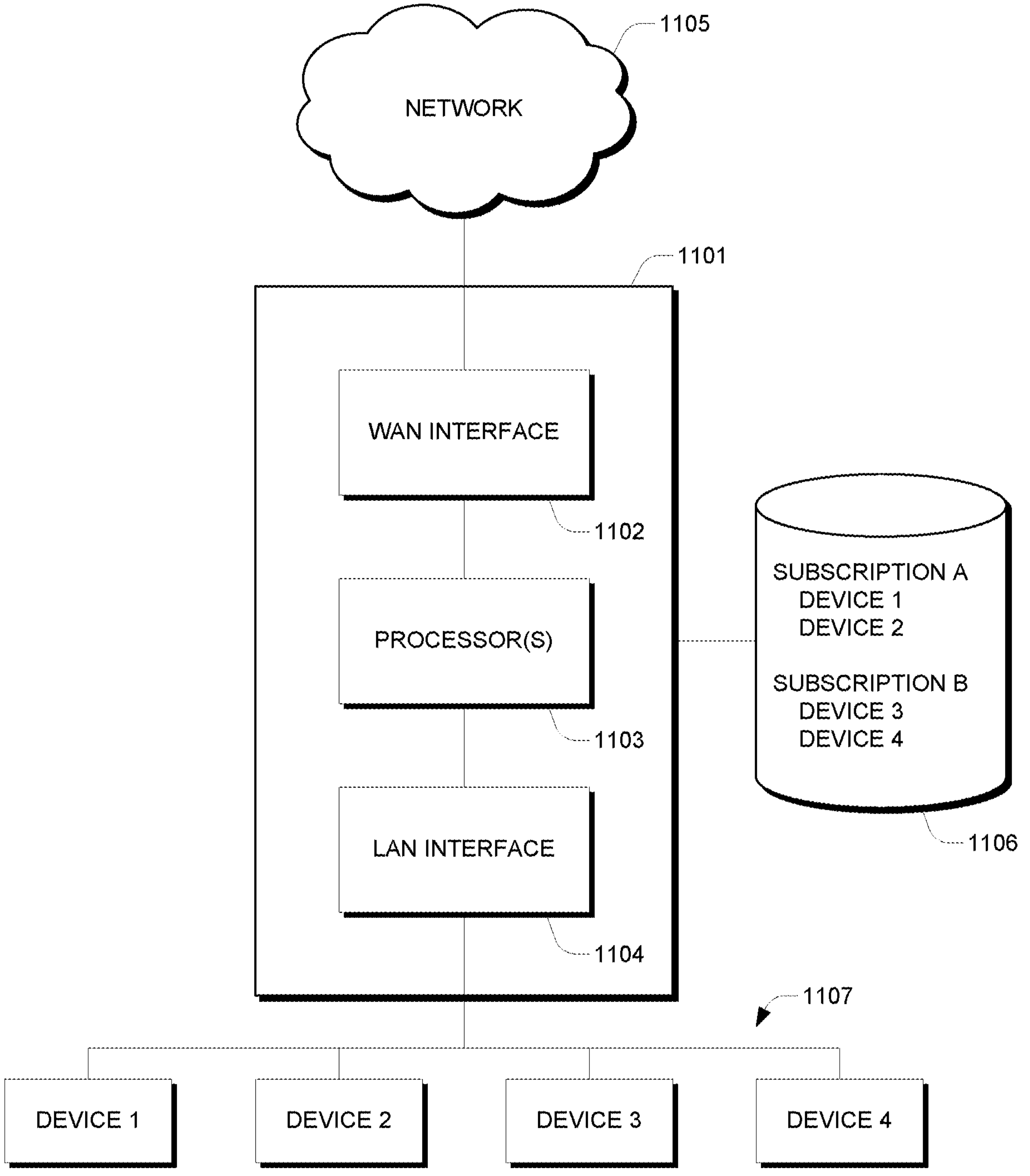
FIG. 11 is a block diagram of a network system connecting subscriber devices to a network, as used in an embodiment.

FIG. 11 is a block diagram of a network system connecting subscriber devices to a network, as used in an embodiment. Network system 1101 may be, for example, gateway device 101 of FIG. 1, possibly in combination with AAA server 102, portal page server 103, data repository 104, data repository 105, and/or other components.

In an embodiment, network system 1101 includes a wide-area network (WAN) interface 1102, one or more processors 1103, and local-area network (LAN) interface 1104. The WAN interface 1102 may be connected to one or more external networks 1105, such as the Internet. The LAN interface 1102 may be connected to one or more subscriber devices 1107, possibly via one or more intermediary network devices such as hubs, routers and/or switches. The LAN may be a network of any type, such as an Ethernet network, a token ring network, a dial-up network, or the like, or any combination of networks. The WAN may similarly be a network of any type or combination. In an embodiment, subscriber devices 1107 are able to communicate with the external networks 1105 through the network system 1101.

The network system 1101 may be configured to manage bandwidth available to subscriber devices 1107. In an embodiment, network system 1101 is in communication with data repository 1106, which may be internal to or external to the network system. The network system may be configured to associate one or more subscriber devices 1107 with a subscription. For example, as shown in FIG. 11, subscriber devices #1 and #2 are associated with subscription A, and devices #3 and #4 are associated with subscription B. Within data repository 1106, subscriptions may be identified by a subscription identifier, such as a unique integer, and subscriber devices may be identified by a device identifier, such as a MAC address or other identifier.

Processors 1103, or other processors or systems, may be configured to create, modify, and/or remove associations between subscriptions and subscriber devices in data repository 1106. The processors 1103 may additionally or alternatively be configured to manage network communications to and from the subscriber devices 1107, based on bandwidth information associated with subscriptions in data repository 1106.

Figure 12:
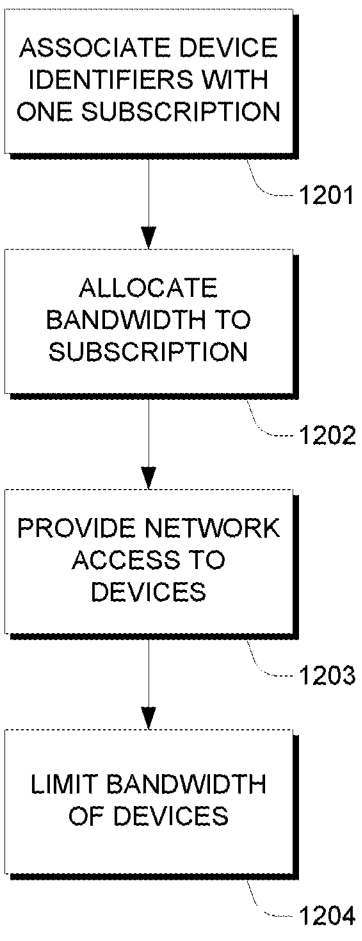
FIG. 12 is a flowchart of a process of associating one or more computers or other computing devices with a network access subscription, as used in an embodiment.

FIG. 12 is a flowchart of a process of associating one or more computers or other computing devices with a network access subscription, as used in an embodiment. The method may be performed, for example, by one or more of the computing systems described in FIGS. 1 and 11, or by other computing systems.

At block 1201, multiple computing devices are associated with a single network access subscription. A network access subscription may be an enrollment, a group bandwidth policy, or the like. The association may be stored within computer-readable storage media for later retrieval.

At block 1202, a subset of available bandwidth is allocated to the network access subscription. The allocated bandwidth may be determined based on parameters associated with the network access subscription, stored or encoded data in the network system, currently available bandwidth, quality-of-service indicators, or the like.

At block 1203, network access is provided to the multiple computing devices. The bandwidth available to those computing devices may then be limited at block 1204. The limitation may be based on the subset of available bandwidth determined at block 1202. The allocated bandwidth may be shared among the computing devices, based on a best-effort allocation, a user defined allocation, a system-computed allocation, or other allocation scheme. Bandwidth may be limited by queuing, delaying, and/or dropping network communication packets, or by other means described herein.

Example System Architecture

Figure 13:
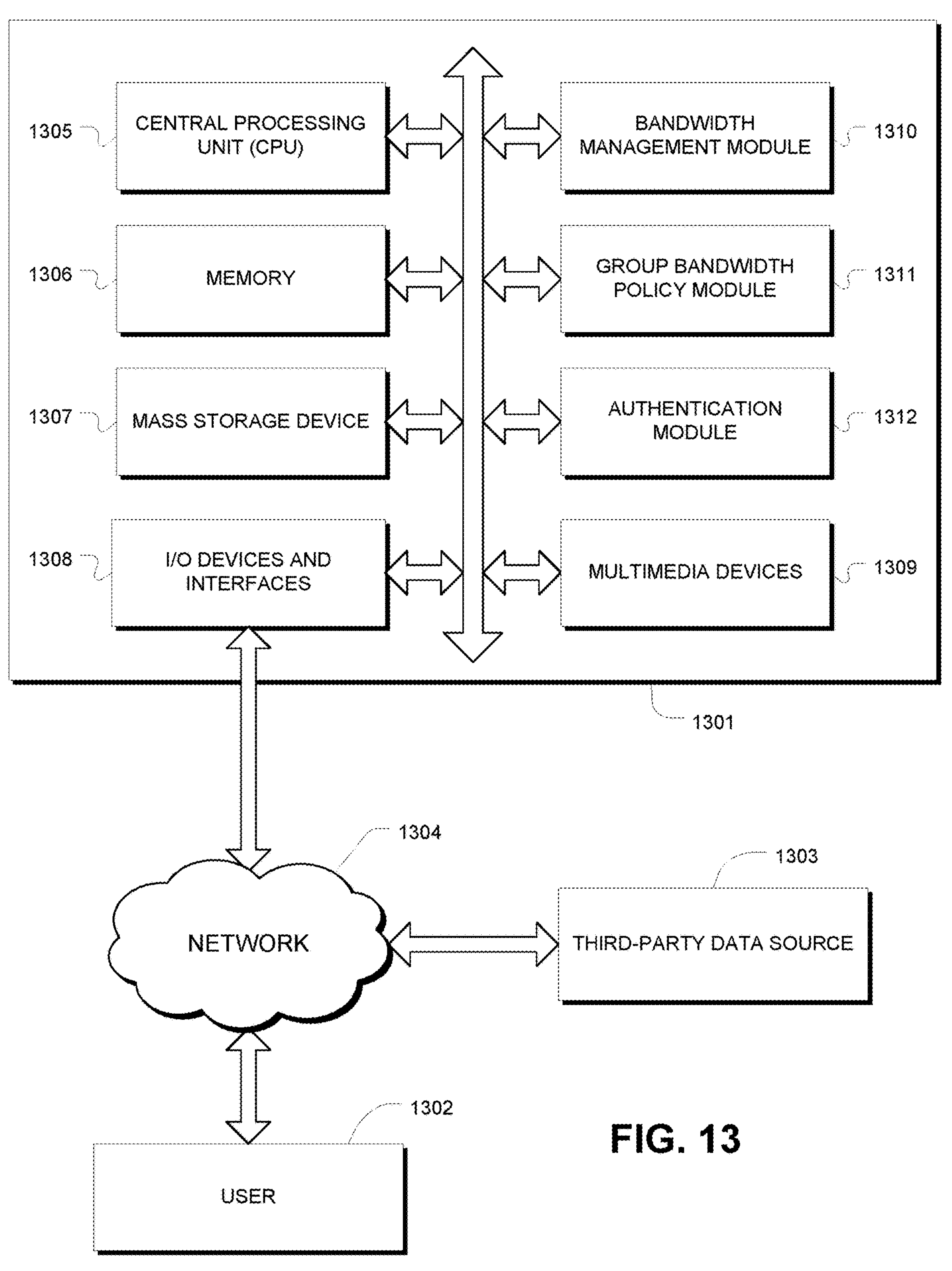
FIG. 13 is a block diagram of a computer system as used in an embodiment.

FIG. 13 is a block diagram illustrating one embodiment of a computing system that implements the systems and methods described herein. In the embodiment of FIG. 13, a computing device 1301 is in communication with a user 1302, as well as an optional third-party data source 1303, via a network 1304. In an embodiment, the computing device 1301 receives data from one or more data sources 1303. The computing device 1301 may then perform analysis and prepare information for presentation to the user 1302. The gateway device 101, AAA server 102, portal page server 103, network system 1101, and/or any other computing system described herein may include the same or similar components as the computing device 1301. Similarly, the computing devices 1301 may be used to implement any of the methods discussed herein.

The network 1304 may include any communication network or combination of communication networks, such as one or more of the Internet, LANs, WANs, MANs, etc., for example. In the embodiment of FIG. 13, the computing device 1301 includes a computing system having one or more computing devices (e.g., computers). The computing device 1301 may include, for example, a single computing device, a computer server, a smart storage unit, or a combination of one or more computing devices and/or computer servers. Depending on the embodiment, the components illustrated in the computing device 1301 may be distributed amongst multiple devices, such as via a local area or other network connection. In other embodiments the computing device 1301 may include fewer and/or additional components that are illustrated in FIG. 13.

The example computing device 1301 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, WindRiver VxWorks, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing device 1301 may be controlled by a proprietary operating system. Conventional operating systems control and schedule computer processes for execution, perform memory management, provide file system, networking, I/O services, and provide a user interface, such as a graphical user interface ("GUI"), among other things.

The computing device 1301 includes one or more central processing units ("CPU") 1305, which may each include one or more conventional or proprietary microprocessor(s). The computing device 1301 may further include one or more memories 1306, such as random access memory ("RAM"), for temporary storage of information, read only memory ("ROM") for permanent storage of information, and/or a mass storage device 1307, such as a hard drive, diskette, or optical media storage device. The memory 1306 may store software code, or instructions, for execution by the processor 1305 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the computing device 1301. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The example computing device 1301 may include one or more input/output (I/O) devices and interfaces 1308, such as a keyboard, trackball, mouse, drawing tablet, joystick, game controller, touchscreen (e.g., capacitive or resistive touchscreen), touchpad, accelerometer, and/or printer, for example. The computing device 1301 may also include one or more multimedia devices 1309, such as a display device (also referred to herein as a display screen), which may also be one of the I/O devices 1308 in the case of a touchscreen, for example. Display devices may include LCD, OLED, or other thin screen display surfaces, a monitor, television, projector, or any other device that visually depicts user interfaces and data to viewers. The computing device 1301 may also include one or more multimedia devices, such as speakers, video cards, graphics accelerators, and microphones, for example.

In the embodiment of FIG. 13, the I/O devices and interfaces 1308 provides a communication interface to various external devices via the network 1304. For example, the computing device 1301 may be electronically coupled to the network 1304 via a wired, wireless, or combination of wired and wireless, communication link(s). The network 1304 may allow communication with various other computing devices and/or other electronic devices via wired or wireless communication links.

In the embodiment of FIG. 13, the computing device 1301 may include various modules described in further detail below. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C#, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 1301, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Example Modules

In the embodiment of FIG. 13, the computing device 1301 includes three modules, namely, a bandwidth management module 1310 that controls uplink and/or downlink bandwidth for connected subscriber devices, a group bandwidth policy module 1311 that manages group bandwidth policies for connected subscriber devices, and an authentication module 1312 that provides for authentication of subscriber devices. In some embodiments, the modules may be distributed across multiple devices, and may be controlled and/or operated by multiple different entities. For example, the modules may be divided among the gateway device 101, the AAA server 102, and the portal page server 103 of FIG. 1, or combined together within one or more devices. As another example, the modules may all be part of network system 1101, or a subset of the modules may be part of network system 1101. These modules are configured to perform methods as described throughout this specification. In various embodiments, fewer or additional modules may be included within a computing system.

The computing device 1301 may be configured to acquire user data and other external data such as third-party data. The various modules and/or other modules may comprise software alone, hardware alone, or a combination of software and hardware. The device may be especially adapted to communicate using a variety of network or communications protocols in order to communicate with external data sources such as data repositories, network servers, online services, telecommunication services, distributed computing systems, and so on. Some of these protocols may include standard network protocols, such as HTTP, FTP, SNMP, or the like. The device may further include hardware drivers, such as USB, Fire Wire, Thunderbolt (Light Peak), or serial communications drivers, for example to communicate with devices in direct communication with the system.

The computing device 1301 may be configured to transmit, or initiate transmission of, data such as user interfaces, data reports, application programming interface data, or the like, to requesting entities, such as external user 1302, that have registered interest with the system. In one embodiment, the device provides the data in an unformatted data structure, such as in an XML, CSV, TXT, or other spreadsheet, text, or web accessible data structure. In other embodiments, the device provides information in user interfaces, such as user interfaces that are configured for rendering by a web browser, mobile device, tablet device, or other device or application, for display to users. A variety of different presentations may be provided. In some embodiments, the requesting entities may indicate presentation preferences or configurations (e.g., data formats and/or types of information), and the device may transmit data based on the indicated preferences or configurations. The presentation format may also be determined based on the type of device being used by the user.

In an embodiment, any or all of the modules described above and/or other modules are configured to act in real-time. Thus, when data is received by the modules, the modules process that data as soon as practicable or necessary to provide users with timely information. In order to achieve this, specialized hardware may be used to gain efficiency, and executable code may be designed to minimize latency or computation time. In an embodiment, the modules, possibly with other modules of the system, are executed within a real-time operating system, to enhance the responsiveness of the system.

Summary

Depending on the embodiment, the systems and methods described with reference to the flowcharts and block diagrams, as well as any other methods discussed herein, may include fewer or additional blocks and/or the blocks may be performed or arranged in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the computing systems 101-103 of FIG. 1, network system 1101 of FIG. 11, and/or other computing devices illustrated in the Figures, in order to perform the respective methods. For ease of explanation, the methods have been described herein as performed by the various modules, such as may be executed on the computing systems 101-103 and/or 1101, which should be interpreted to include any one or more of the computing devices noted above and/or any other suitable computing device.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing devices described herein and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method comprising:

receiving, at a gateway device via one or more computer processors, connection parameters associated with a first subscriber device, wherein:

the first subscriber device is associated with a group bandwidth policy, and the group bandwidth policy indicates a maximum bandwidth to be shared by multiple subscriber devices, the multiple subscriber devices comprising the first subscriber device and a second subscriber device;

receiving, at the gateway device via the one or more computer processors, a network identifier of the first subscriber device, receiving, at the gateway device, first network communication data from the first subscriber device, and receiving, at the gateway device, second network communication data from the second subscriber device, wherein:

the first network communication data is communicated by the gateway device to an external network in response to a determination, based on the connection parameters and based further on the network identifier, that the first network communication data does not exceed the maximum bandwidth of the group bandwidth policy, the gateway device forgoes communicating the second network communication data to the external network in response to a determination that the second network communication data exceeds the maximum bandwidth of the group bandwidth policy, the gateway device is configured to communicate the first network communication data and the second network communication data to the external network, such that the first network communication data and the second network communication data appear to the external network to originate from a single subscriber device, and the gateway device treats the first network communication data and the second network communication data as if transmitted via the gateway device to the external network from a single device according to the group bandwidth policy.

2. The method of claim 1, wherein the connection parameters are received at the gateway device via a portal page server.

3. The method of claim 2, wherein the maximum bandwidth is determined based on a selection provided via the portal page server.

4. The method of claim 1, wherein the maximum bandwidth is determined by an operator of a network associated with a hotel, and wherein the first subscriber device is associated with a guest of the hotel.

5. The method of claim 1, wherein the maximum bandwidth is determined by an operator of a network associated with a conference, and wherein the first subscriber device is associated with a participant in the conference.

6. The method of claim 1, wherein the maximum bandwidth comprises one or more of an uplink bandwidth and a downlink bandwidth.

7. The method of claim 1, wherein in response to a determination that the second network communication data exceeds the maximum bandwidth of the group bandwidth policy, the gateway device performs one or more of queueing packets, delaying packets, and dropping packets.

8. A method comprising:

receiving, at a gateway device via one or more computer processors, connection parameters associated with a first subscriber device, wherein:

the first subscriber device is associated with a group bandwidth policy, and the group bandwidth policy indicates a maximum bandwidth to be shared by multiple subscriber devices, the multiple subscriber devices comprising the first subscriber device and a second subscriber device;

receiving, at the gateway device via the one or more computer processors, a network identifier of the first subscriber device, receiving, from the first subscriber device via the gateway device, a request for first network communication data from an external network, and receiving, from the second subscriber device via the gateway device, a request for second network communication data from the external network, wherein:

the first network communication data is transmitted by the gateway device from the external network to the first subscriber device in response to a determination, based on the connection parameters and based further on the network identifier, that the first network communication data does not exceed the maximum bandwidth of the group bandwidth policy, the gateway device forgoes transmitting the second network communication data from the external network to the second subscriber device in response to a determination that the second network communication data exceeds the maximum bandwidth of the group bandwidth policy, the gateway device is configured to communicate the request for first network communication data and the request for second network communication data to the external network, such that the request for first network communication data and the request for second network communication data appear to the external network to originate from a single subscriber device, and the gateway device treats the first network communication data and the second network communication data as if transmitted via the gateway device from the external network to a single device according to the group bandwidth policy.

9. The method of claim 8, wherein the connection parameters are received at the gateway device via a portal page server.

10. The method of claim 9, wherein the maximum bandwidth is determined based on a selection provided via the portal page server.

11. The method of claim 8, wherein the maximum bandwidth is determined by an operator of a network associated with a hotel, and wherein the first subscriber device is associated with a guest of the hotel.

12. The method of claim 8, wherein the maximum bandwidth is determined by an operator of a network associated with a conference, and wherein the first subscriber device is associated with a participant in the conference.

13. The method of claim 8, wherein the maximum bandwidth comprises one or more of an uplink bandwidth and a downlink bandwidth.

14. The method of claim 8, wherein in response to a determination that the second network communication data exceeds the maximum bandwidth of the group bandwidth policy, the gateway device performs one or more of queueing packets, delaying packets, and dropping packets.

15. A non-transitory computer-readable storage medium storing instructions which, when executed by one or more processors, cause the one or more processors to perform a method comprising:

receiving, at a gateway device, connection parameters associated with a first subscriber device, wherein:

the first subscriber device is associated with a group bandwidth policy, and the group bandwidth policy indicates a maximum bandwidth to be shared by multiple subscriber devices, the multiple subscriber devices comprising the first subscriber device and a second subscriber device;

receiving, at the gateway device, a network identifier of the first subscriber device, receiving, from the first subscriber device via the gateway device, a request for first network communication data from an external network, and receiving, from the second subscriber device via the gateway device, a request for second network communication data from the external network, wherein:

the first network communication data is transmitted by the gateway device from the external network to the first subscriber device in response to a determination, based on the connection parameters and based further on the network identifier, that the first network communication data does not exceed the maximum bandwidth of the group bandwidth policy, the gateway device forgoes transmitting the second network communication data from the external network to the second subscriber device in response to a determination that the second network communication data exceeds the maximum bandwidth of the group bandwidth policy, the gateway device is configured to communicate the request for first network communication data and the request for second network communication data to the external network, such that the request for first network communication data and the request for second network communication data appear to the external network to originate from a single subscriber device, and the gateway device treats the first network communication data and the second network communication data as if transmitted via the gateway device from the external network to a single device according to the group bandwidth policy.

16. The non-transitory computer-readable storage medium of claim 15, wherein the connection parameters are received at the gateway device via a portal page server and wherein the maximum bandwidth is determined based on a selection provided via the portal page server.

17. The non-transitory computer-readable storage medium of claim 15, wherein the maximum bandwidth is determined by an operator of a network associated with a hotel, and wherein the first subscriber device is associated with a guest of the hotel.

* * * * *